US006219011B1

(12) United States Patent
Aloni et al.

(10) Patent No.: US 6,219,011 B1
(45) Date of Patent: *Apr. 17, 2001

(54) ELECTRO-OPTICAL DISPLAY APPARATUS

(75) Inventors: Meir Aloni, Herzlia; Amir Rosenthal, Ra'anana; Avinoam Livni, Haifa; Nissim Elmaliah, Ra'anana, all of (IL)

(73) Assignee: ComView Graphics, Ltd., Ra'anana (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,942

(22) Filed: Sep. 17, 1997

(30) Foreign Application Priority Data

Sep. 17, 1996 (IL) .................................................. 119259

(51) Int. Cl.⁷ ..................................................... G09G 5/00
(52) U.S. Cl. .................... 345/1; 345/4; 345/207; 348/383; 348/745; 348/750; 348/751
(58) Field of Search ........................ 345/1, 30–32, 345/36–42, 63, 77, 81, 87, 90, 142–147, 207; 340/815.42; 348/383, 745, 750, 751

(56) References Cited

U.S. PATENT DOCUMENTS

| 4,454,417 | * | 6/1984 | May | 250/216 |
|---|---|---|---|---|
| 4,591,232 | * | 5/1986 | Jeskey | 350/96.27 |
| 4,644,341 | * | 2/1987 | Warner | 345/39 |
| 4,825,201 | * | 4/1989 | Watanabe et al. | 345/1 |
| 4,866,530 | * | 9/1989 | Kalua | 358/237 |
| 4,919,518 | * | 4/1990 | Ogino et al. | 350/128 |
| 5,231,481 | * | 7/1993 | Eouzan et al. | 348/658 |
| 5,315,378 | * | 5/1994 | Satou et al. | 348/655 |
| 5,396,257 | * | 3/1995 | Someya et al. | 345/1 |
| 5,434,595 | * | 7/1995 | Macaulay | 345/207 |
| 5,452,019 | * | 9/1995 | Fukuda et al. | 348/655 |
| 5,495,269 | * | 2/1996 | Elrod et al. | 345/179 |
| 5,585,691 | * | 12/1996 | Washburn | 313/452 |
| 5,668,569 | * | 9/1997 | Greene et al. | 345/103 |
| 5,708,528 | * | 1/1998 | Furuya | 359/457 |
| 5,771,039 | * | 6/1998 | Ditzik | 345/178 |
| 5,793,441 | * | 8/1998 | Hagerman | 348/658 |
| 5,798,790 | * | 8/1998 | Knox et al. | 348/191 |
| 5,805,117 | * | 9/1998 | Mazurek et al. | 345/1 |
| 5,847,784 | * | 12/1998 | Finnila et al. | 349/73 |

* cited by examiner

*Primary Examiner*—Richard Hjerpe
*Assistant Examiner*—Henry N. Tran
(74) *Attorney, Agent, or Firm*—Benjamin J. Barish

(57) ABSTRACT

Electro-optical display apparatus includes a plurality of modular units each having a projector for receiving electrical signals, converting them to optical images, and projecting the optical images via an optical projection system onto a screen. The modular units are arranged in a side-by-side array such as to produce a combined display on the screen. A calibration system detects distortions in the combined display caused by the projection system of each modular unit and modifies the electrical signals applied to the projector of each modular unit to correct the combined display with respect to the detected distortions.

25 Claims, 34 Drawing Sheets

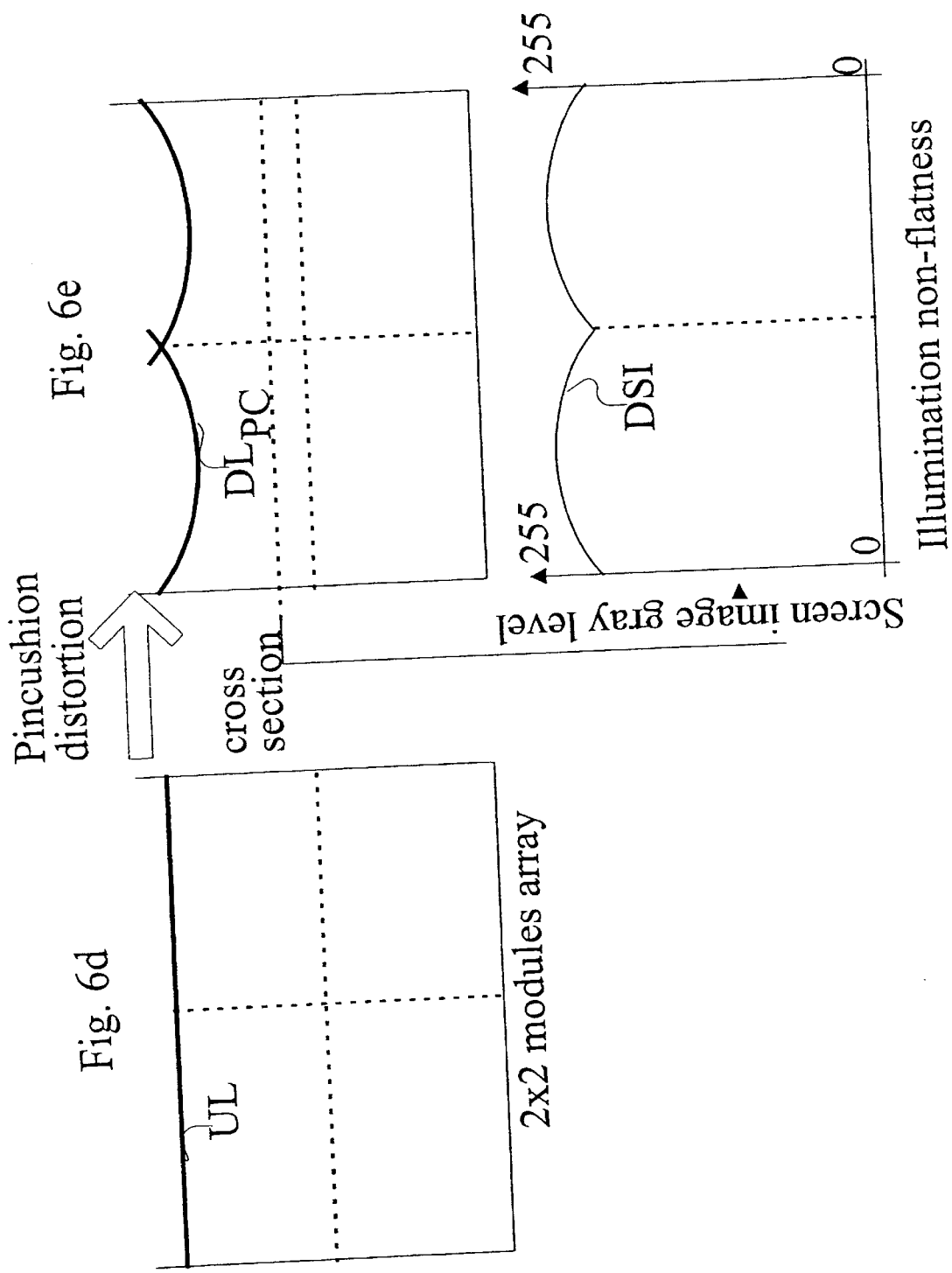

Calibration grid on combined screen

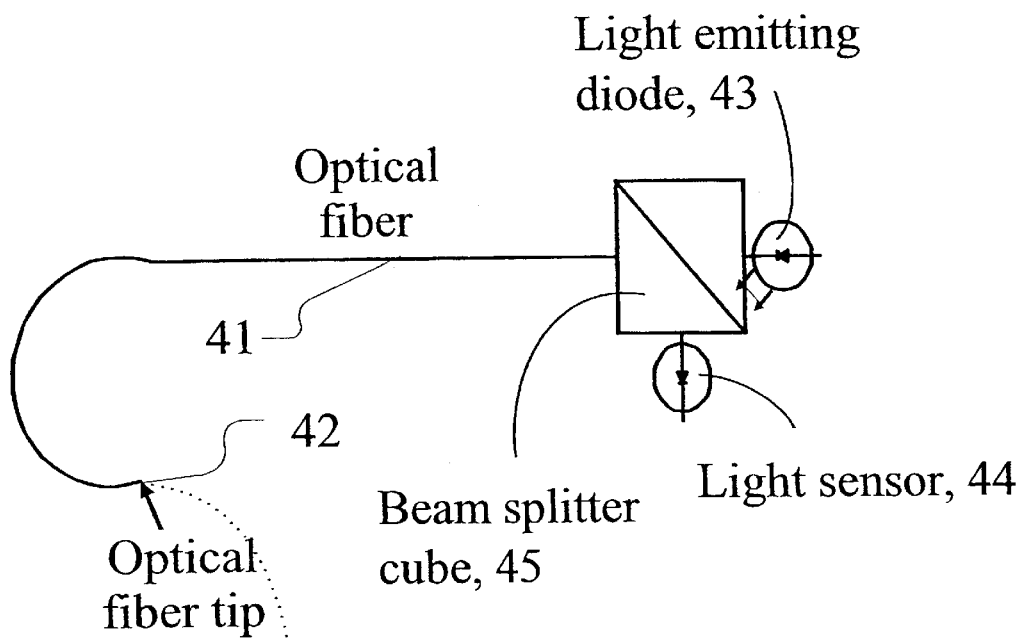
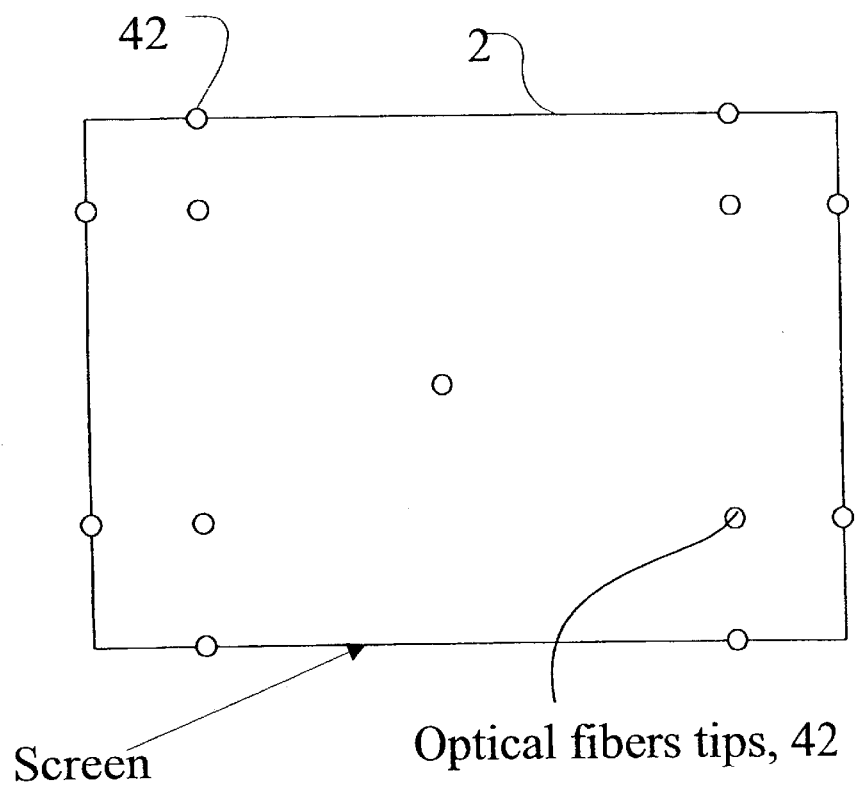
Fig. 10

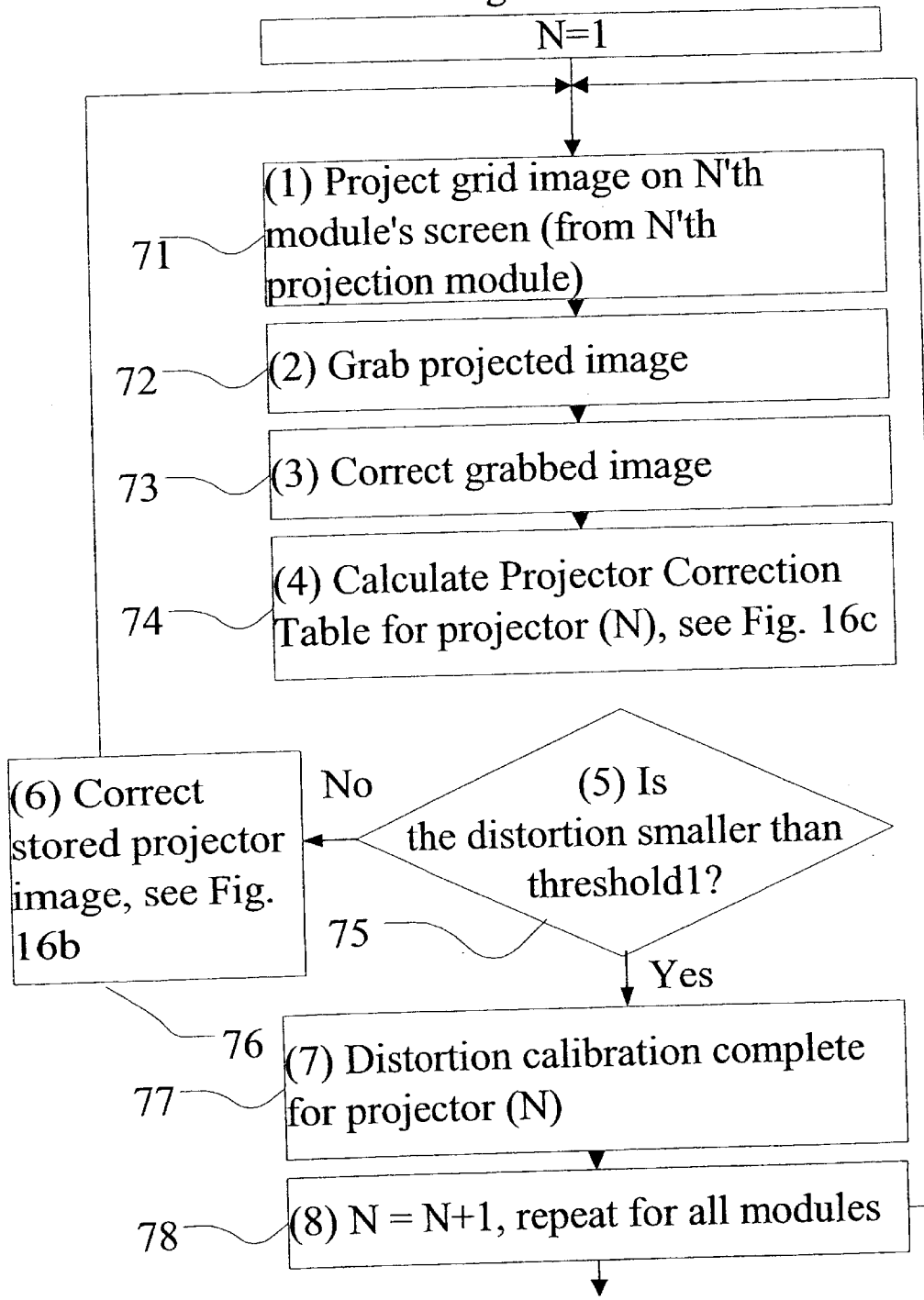

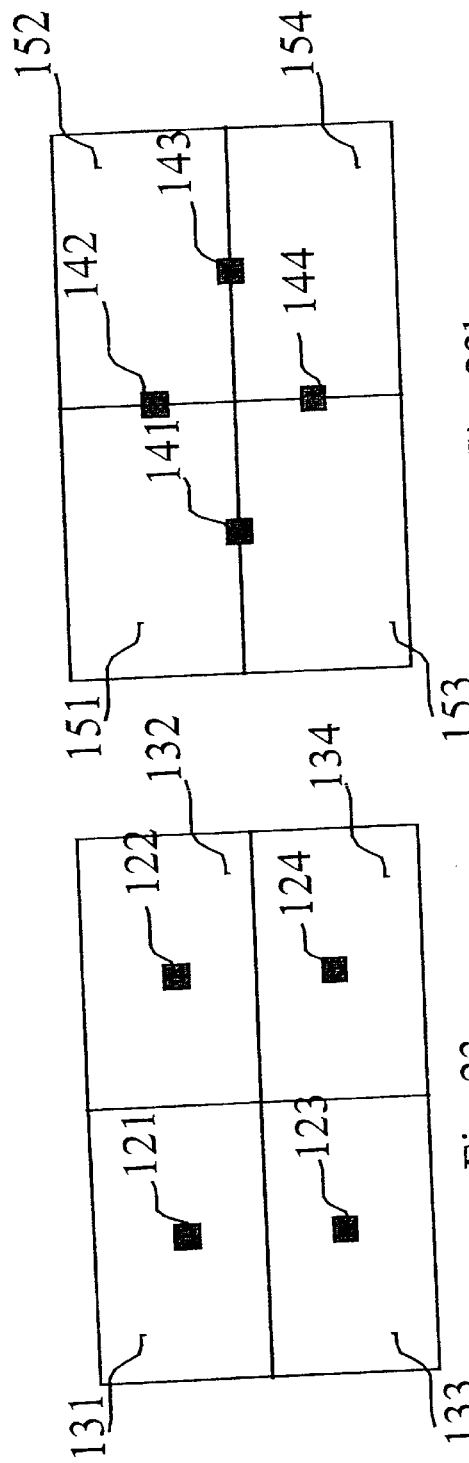
Fig. 23b
Fig. 23a
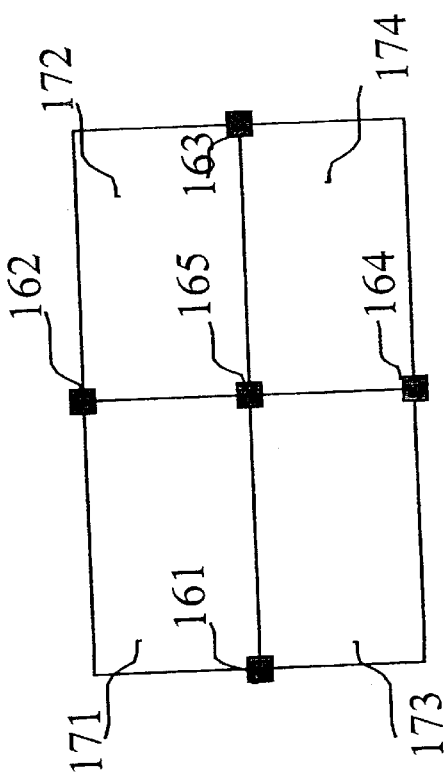
Fig. 23c

Fig. 24

Color Convergence Correction - Single Projector

Project a Red/Green/Blue internal triangle

↓

Each camera (centered around one of the projector's corners) detects the two perpendicular lines forming the said rectangle's corner. Hence the exact location of the corner can be found.

↓

Use the center of the blocking rectangle of the 3 corners as a 'corrected corner location.

↓

Align the R/G/B corners to the corrected position. All other points (not corners) are aligned using interpolated values based on the corners.

Geometric Distortions Correction - Single Projector

ELECTRO-OPTICAL DISPLAY APPARATUS

FIELD AND BACKGROUND OF THE INVENTION

The present invention relates to electro-optical display apparatus. The invention is particularly useful in large interactive displays of the type enabling one or more persons to interact with the display, by adding to, deleting from, or otherwise changing the displayed information; and the invention is therefore described below with respect to such an application.

Various types of interactive displays are known, as described for example in U.S. Pat. No. 5,495,269 and WO 95/34881. Such known displays are generally constructed with the appropriately-sized screen according to the particular application. Each display must therefore be specially designed for the respective screen size. Moroever, the depth of the display generally increases with the size of its screen.

OBJECTS AND BRIEF SUMMARY OF THE INVENTION

An object of the present invention is to provide displays which can be constructed so that they may be assembled in different sizes according to the respective application. Another object of the invention is to provide display apparatus which can be assembled to provide a relatively large size display but having relatively small depth. A further object of the invention is to provide an electro-optical device which can be used in an interactive manner by a user without the user obstructing the screen. A still further object of the invention is to provide a method of producing electro-optical displays of the interactive type.

According to one aspect of the present invention, there is provided electro-optical display apparatus, comprising: a plurality of modular units each including a projector for receiving electrical signals, converting them to optical images, and projecting the optical images via an optical projection system onto the screen; the plurality of modular units being arranged in a side-by-side array such as to produce a combined display on a screen; the image sensor and imaging means being located on the same side of the screen as the projectors; the apparatus further comprising a calibration system including an image sensor for sensing an optical image on the screen, and imaging means, such as an imaging lens, for imaging the screen on the image sensor for detecting distortions in the combined display caused by the projection system of each modular unit and for modifying the electrical signals applied to the projector of each modular unit to correct the combined display with respect to the detected distortions.

According to further features in the described preferred embodiment, the screen is constituted of a plurality of modular unit screens, one provided on each of the modular units; and imaging means as set forth above for imaging the screen on the image sensor.

According to still further features in the described preferred embodiments, the screen is of a size and configuration to overlie all the modular units. In addition, the calibration system may also include a two-dimensional array of reference points of known locations on the face of the screen.

In one described preferred embodiment, the two-dimensional array of reference points is defined by the intersection points of a plurality of horizontal reference lines and a plurality of vertical reference lines on the screen. In a second described embodiment, the two-dimensional array of reference points are the ends of optical fibers on the screen. The reference lines may also be the joint border lines of the individual module screens. In any case, the selected calibration technique may be used for on-line calibration or only for off-line calibration.

It will thus be seen that the foregoing features of the invention permit display apparatus to be constructed from one or more modular units of the same design, size and configuration, and to be assembled according to the particular application. For example, apparatus can be assembled with two modular units arranged in a straight line, four modular units arranged in a 2×2 array, nine modular units arranged in a 3×3 array, etc., according to the size of the screen desired for the particular application. It will also be seen that the depth of the overall display will be the same irrespective of the size of the screen.

Such an apparatus is capable of grabbing any image that appears on the screen, including images projected on the screen by a light projector or any hand-written script using dry-erase markers, electronic pens, etc. The apparatus can also grab the image of any object, e.g., documents, placed against the screen. Thus, the apparatus can be used not only for displaying documents, but also for storing or transmitting documents. Since the combined screen is not obstructed by the user, the user can conduct a natural flowing presentation. Since the system is modular, the configuration and the size of the combined screen can be fitted to any application; and since the system depth is relatively small, it may be used in office-like environments, or other space-limited environments, such as conference rooms, airport aisles (corridors), etc.

The calibration system is preferably built into the apparatus as an integral part of the apparatus so that it can be conveniently used to recalibrate the system as frequently as may be desired, e.g., to compensate for the tendency of the opto-mechanical systems to drift with time and temperature. While the calibration system is particularly useful with respect to a large viewing area apparatus constructed of a plurality of modular units as described above, the calibration system could also be used in a single-unit setup.

According to still further features in the described preferred embodiments of both the multiple-unit and single-unit setup, the calibration system generates an image path correction table for each unit for correcting discrepancies between the known locations of the two-dimensional array of reference points on the screen and the corresponding locations of the two-dimensional array of reference points as imaged on the screen. It also generates a projector-path correction table for each unit for correcting discrepancies between the known locations of the two-dimensional array of reference points on the screen and the corresponding locations of the two-dimensional array of reference points as projected on the screen.

According to a yet further aspect of the present invention, there is provided a method of producing an electro-optical display comprising: providing a plurality of modular units each including a projector for receiving electrical signals, converting them to optical images, and projecting the optical images via an optical projection system on a screen; arranging the plurality of modular units in a side-by-side array such as to combine their respective displays to produce a combined display; imaging the screen via imaging means, such as a lens, onto an image sensor for detecting distortions in the combined display; and modifying the electrical signals applied to the projector of each modular unit to correct the combined display with respect to the detected distortions.

Electro-optical display apparatus constructed in accordance with the foregoing features may be used in a large number of applications, including conference rooms, control centers, and electronic bill-boards, as well as in front/rear large projection systems.

Further features and advantages of the invention will be apparent from the description below.

BRIEF DESCRIPTION OF THE DRAWINGS

The invention is herein described, by way of example only, with reference to the accompanying drawings, wherein:

FIGS. 6a–6e illustrate various types of distortions produced in the optical systems of the modular units which distortions are to be corrected by the calibration systems of the modular units;

FIG. 10 illustrates an alternative structure of a combined screen for calibrating the modular units for both distortions caused by the optical systems and non-uniformity in light intensity in the modular units;

FIG. 16 is a flowchart illustrating operation B in FIG. 14;

FIGS. 23a, 23b and 23c are diagrams illustrating different camera positioning arrangements to allow better distortion correction;

FIG. 24 is a flowchart illustrating one example of the operations involved in using the camera positioning arrangement of FIG. 23c for correcting color-convergence distortions in a single projector;

DESCRIPTION OF PREFERRED EMBODIMENTS

Modular Construction

Figure 1:
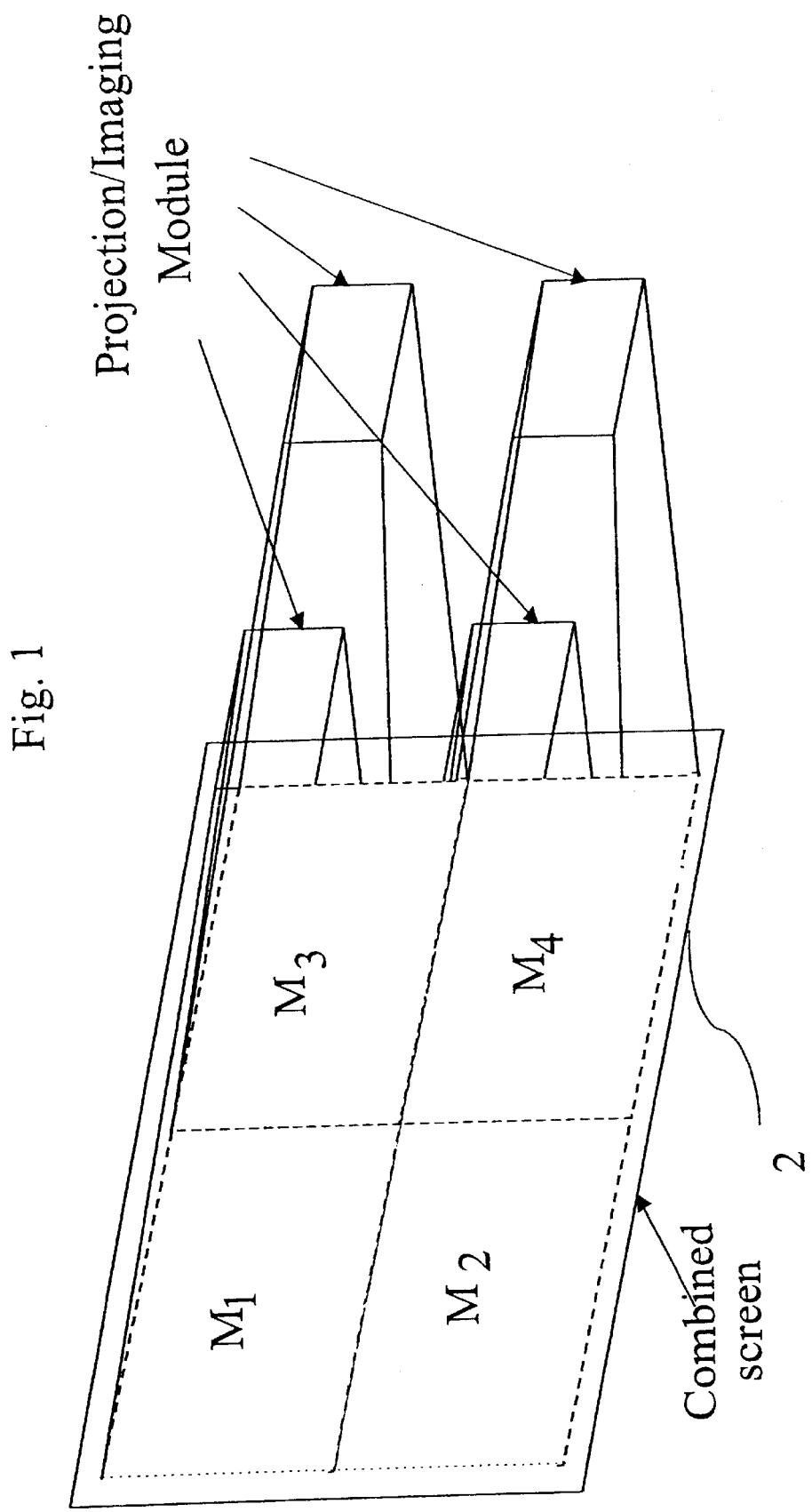
FIG. 1 diagrammatically illustrates one example of a display apparatus in accordance with the present invention including four modular units, and a combined screen overlying the screens of all the modular units.

FIG. 1 illustrates one form of display apparatus constructed in accordance with the present invention and constituted of four modular units $M_1$–$M_4$ arranged in a 2×2 array in abutting relation such as to combine their respective displays to produce a combined display. The apparatus further includes a combined screen, generally designated 2, of a size and configuration to overlie all the modular units. All four modular units are of the same design, size and configuration so that they can be assembled to produce a combined screen of the size and configuration desired for any particular application.

Figure 2:
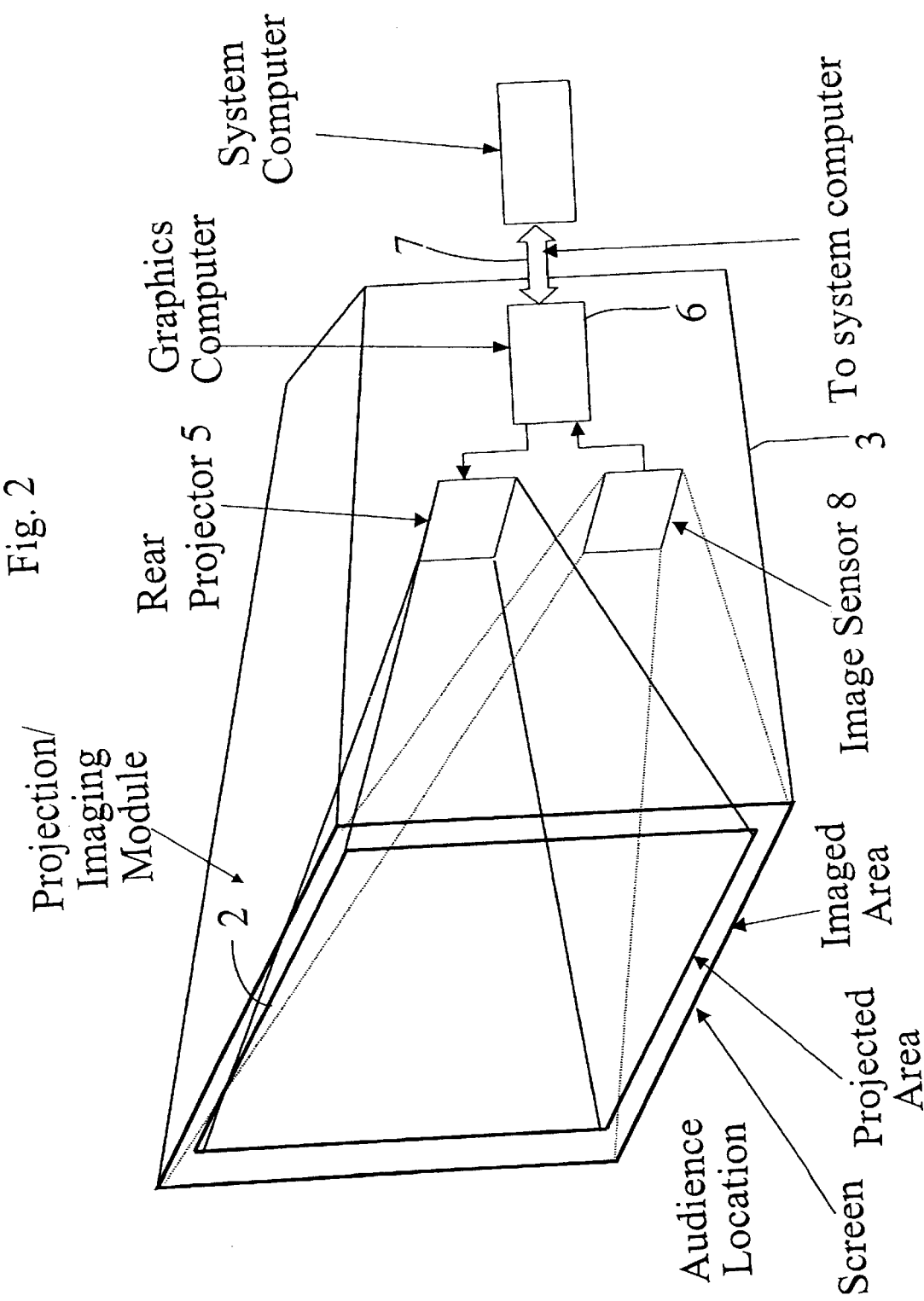
FIG. 2 diagrammatically illustrates one construction of a modular unit used in the display apparatus of FIG. 1.

The construction of each modular unit $M_1$–$M_4$ is diagrammatically illustrated in FIG. 2. Each modular unit includes a housing 3, and a rear projector 5 for receiving electrical signals, converting them to optical images, and projecting the optical images onto screen 2 via an optical projection system. The rear projector 5 is driven by a graphics computer 6 which receives the electrical signals via an input port 7 from a systems computer SC. Graphics computer 6 is preferably constructed as a separate unit and not built into the module.

Each modular unit further includes an image sensor 8 for receiving an optical image on the screen of the respective unit via an optical imaging system and for converting the image to electrical signals. These electrical signals are supplied to the graphics computer 6 for driving the rear projector 5 to include also the images appearing on screen 2.

Rear projector 5 is preferably an active color LCD (liquid crystal display) projector. However, it could be a Digital Micromirror Device Projector, or any other known type of projector. Image sensor 8 is preferably a CCD (charge coupled device) commonly used today in area cameras. However, it could be any other type of image sensor, such as a tube camera, a scanner, etc.

The graphics computer 6 receives electrical signals from the image sensor 8, and from the systems computer SC via the input port 7, and generates the signals (e.g., video signals) driving the rear projector 5. Graphics computer 6 further includes a built-in calibration system for calibrating the modular unit with respect to distortions (e.g., spatial, intensity, and color) in the projected images in the respective modular unit so as to reduce these distortions as appearing in the combined screen 2 for all the modular units. The calibrating system also eliminates overlaps and gaps in the combined display on screen 2 of the four modular unit displays.

Optical Systems

Figure 3:
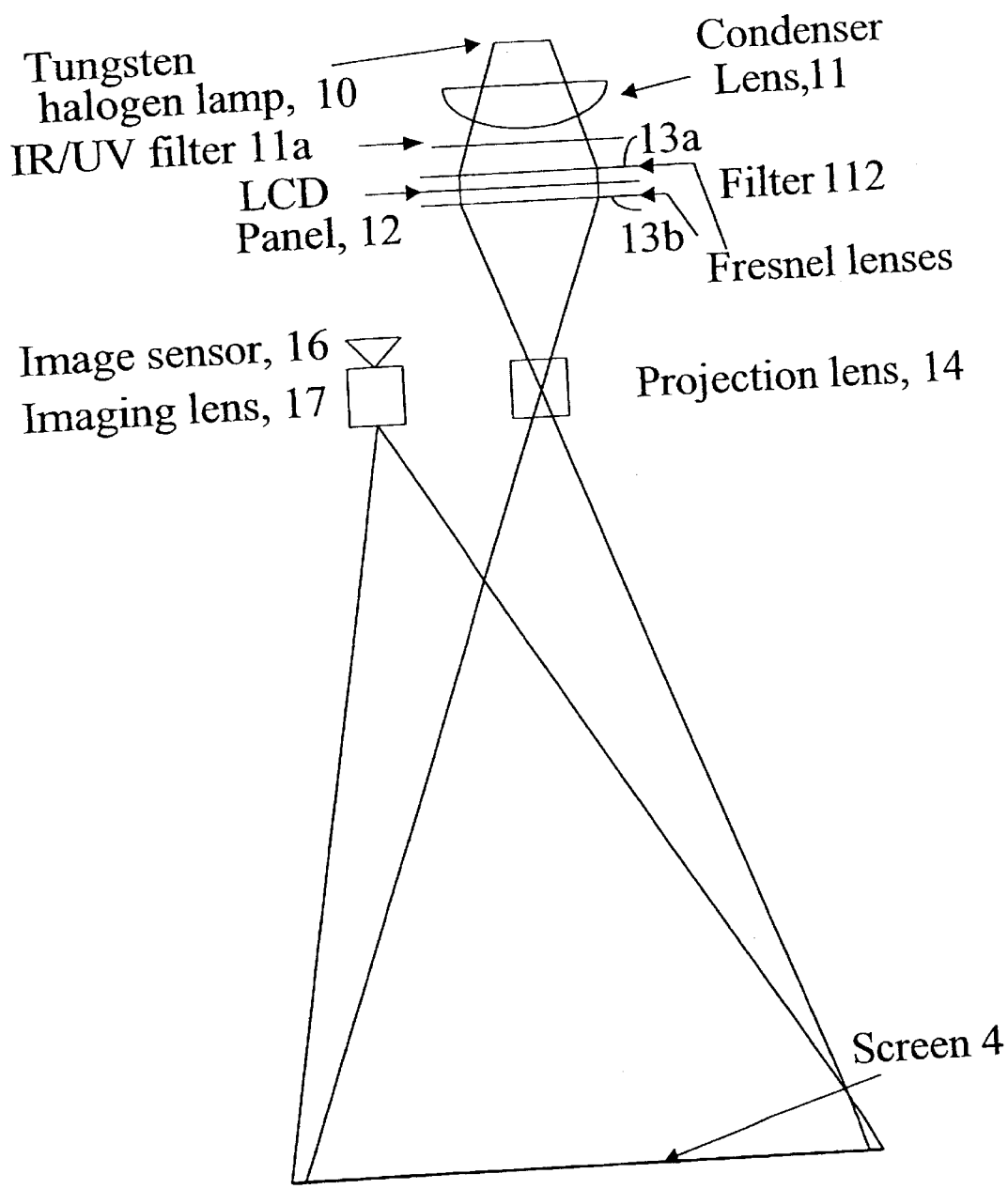
FIG. 3 diagrammatically illustrates the optical system in one of the modular units in the apparatus of FIG. 2.
Figure 4:
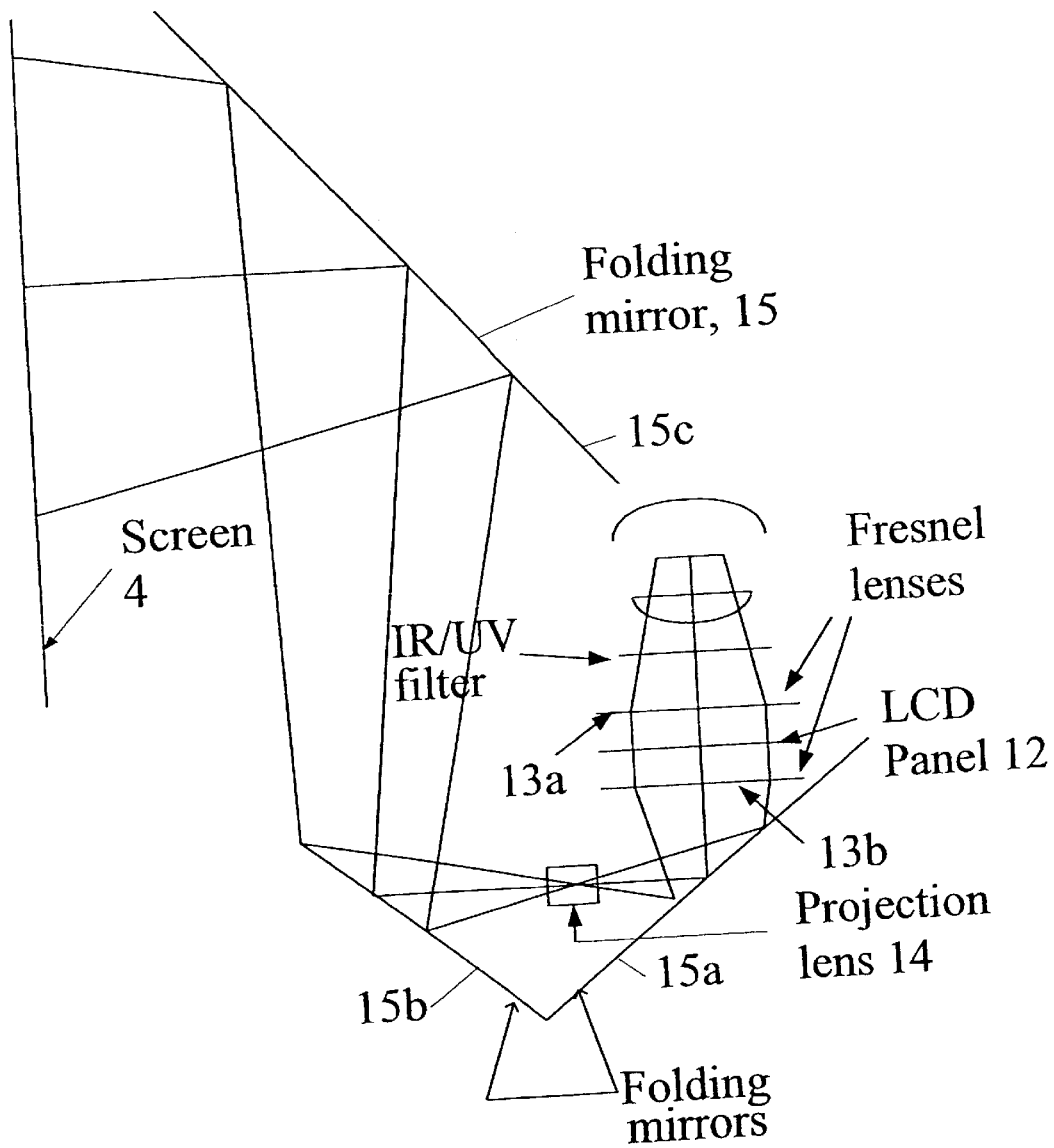
FIG. 4 more particularly illustrates the folded mirror arrangement in the optical system in one of the modular units.

FIGS. 3 and 4 diagrammatically illustrate the optical projection system for projecting the image produced by the rear projector 5 of the respective modular unit on screen 2, and also the optical imaging system for imaging the screen 2 on the image sensor 8 of the respective modular unit.

Thus, as shown in FIGS. 3 and 4, the optical projection system includes a lamp and reflector 10. This lamp may be of any known type (e.g., tungsten halogen lamp, silver halogen lamp, arc lamp, etc.) which illuminates, via a condensor lens 11 and IR/UV filter 11*a*, an LCD light modular panel 12 straddled by a pair of Fresnel lenses 13*a*, 13*b*. The image is magnified by a projection lens 14, and is projected by folding mirrors 15*a*, 15*b*, 15*c*, onto the screen 2. The optical imaging system images the screen 2 onto the image sensor 16 via mirrors 15*a*–15*c* and a lens system 17.

The light reflected from the screen 2 thus represents a combined image, namely a superposition of the image produced by each rear projector 5, and any image written or projected onto the front side of the screen and imaged onto the image sensor 8. The graphics computers 6 store a replica of the rear-projected images and of the captured combined image. From these two images, the system can determine the user input, namely the image written or projected onto the screen from the front side of the screen.

Alternatively another technique for grabbing the image written or projected on the front of the screen is by momentarily turning off the image produced by the rear projector, and subsequently reading the image written or projected on the front side. This technique simplifies the determination process of the user input since the grabbed image does not include the rear projected image.

Both the optical projector system and the optical imaging system inherently produce distortions, which are detected and corrected by the graphics computer 6, as will be described more particularly below, so as to produce a more satisfactory display on screen 2 combining the images generated by each of the modular units $M_1$–$M_4$.

Figure 5:
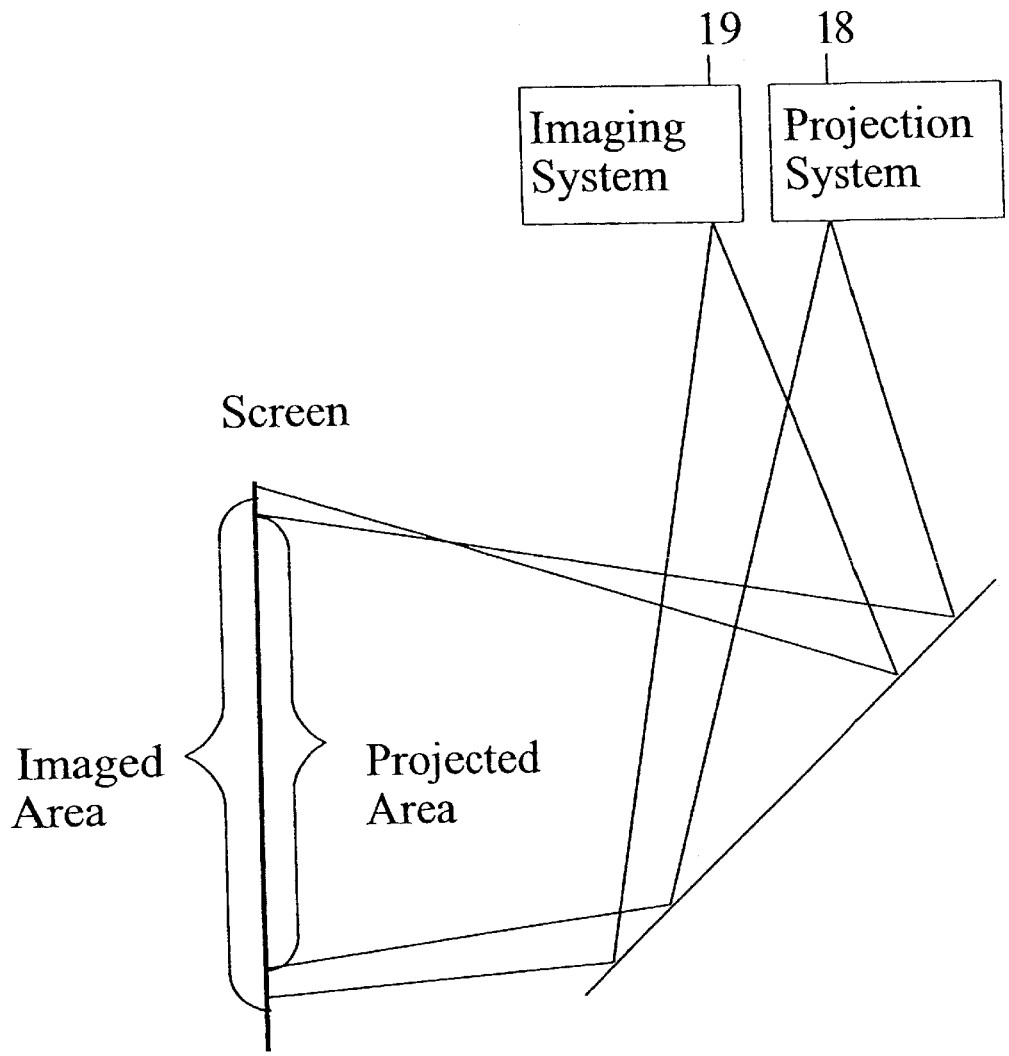
FIG. 5 diagrammatically illustrates another type of optical system that may be used in each modular unit.

FIG. 5 diagrammatically illustrates another optical arrangement that may be used for each of the modular units $M_1$–$M_4$. As in FIG. 3, instead of using a common optical system for combining the image projected by the rear-projector 5 onto the screen 2 and the image of the screen 2 received by the image sensor 8, the modular unit is provided with a separate optical projection system diagrammatically illustrated at 18, and a separate optical imaging system diagrammatically illustrated at 19. However, in FIG. 5 the projection system and the imaging system include a folded mirror arrangement as in FIG. 4.

Distortions Produced by the Opto-Mechanical Systems

Figure 6A:
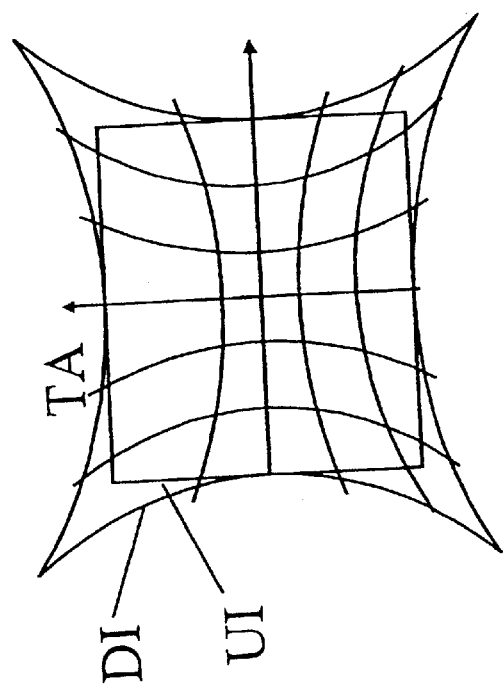
Figure 6B:
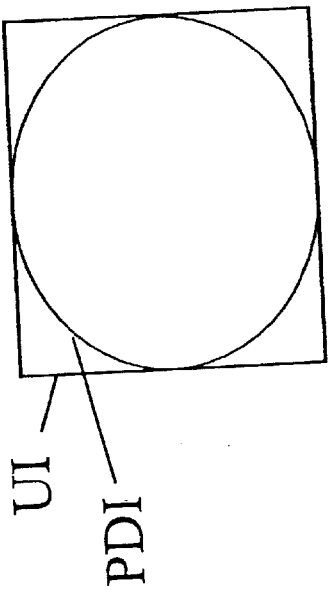
Figure 6C:
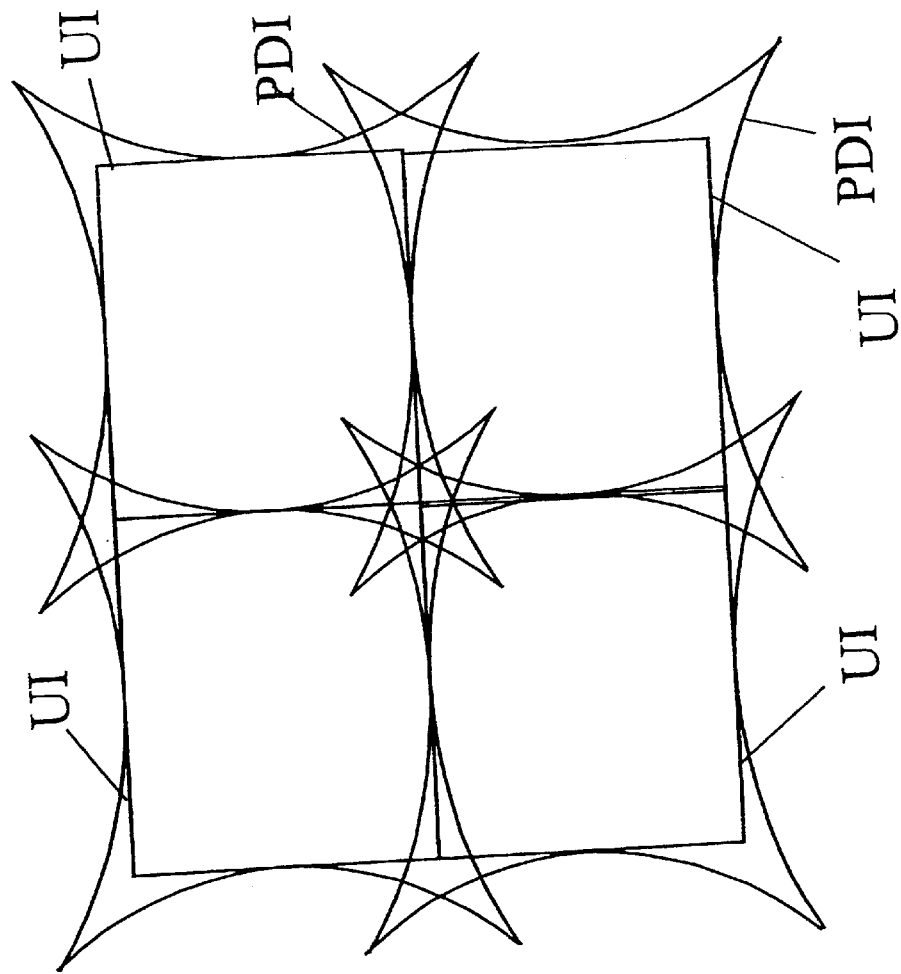

It is an inherent characteristic of optical systems that they produce distortions when magnifying images. FIG. 6*a* illustrates a rectangular undistorted or ideal image UI having a longitudinal axis LA and a transverse axis TA. FIG. 6*a* also illustrates a pin-cushion type distorted image PDI, wherein it will be seen that the amount of distortion varies with the distance from the longitudinal axis LA and transverse axis TA. FIG. 6*b* illustrates a barrel-type distorted image BDI with respect to the undistorted image UI. FIG. 6*c* illustrates how a display combining the displays of the four modular units $M_1$–$M_4$ would appear without correction of the distortions produced in each of the four modular units.

FIG. 6*d* illustrates an undistorted straight, horizontal line UL, to be projected on the combined screen by the four modular units $M_1$–$M_4$; whereas FIG. 6*e* illustrates at $DL_{pc}$ how that line would be distorted by the pin-cushion effect, and DSI the resultant screen image gray level if the distortions are not corrected.

When viewing a screen containing but a single display from a single modular unit, the optical distortions produced by the optical system can frequently be passed without notice; however, when producing a combined image wherein a plurality (in this case four) displays are "stitched" together in a "seamless" manner, geometric and color distortions produced in each modular unit are very much noticeable in the combined display. The major distortions are:

1. Straightness distortions, resulting from the pin cushion (PC) or barrel effect;
2. Overlaps and gaps along the contiguous sides of the combined displays, resulting from the pin cushion (PC) and barrel distortions;
3. Non-uniformly in illumination (monochromatic and color), resulting from differences in the light-intensity level of the individual modular units;
4. Chromatic aberration;
5. keystone (KS) effect;
6. differences in magnification (M) between adjacent projectors;
7. rotation (R) distortion;
8. translation (X,Y) distortion; and
9. convergence (C) distortions inherent in individual projectors.

The Calibration System

It will thus be seen that in order to combine the displays of a plurality of modular units, a calibration system is needed to detect these distortions and to correct the combined image with respect to these distortions. The calibration system to be described below corrects for most of the above distortions. While the calibration system can be provided as a separate system, to be used during the first setup of the display system or whenever else it may be desired to calibrate the system, the calibration system included in the apparatus to be described below is built into the system as an integral part. It therefore has the important advantages that it can be more frequently used in a convenient manner to correct for the tendency of optical-mechanical systems to drift with time and temperature.

Figure 7:
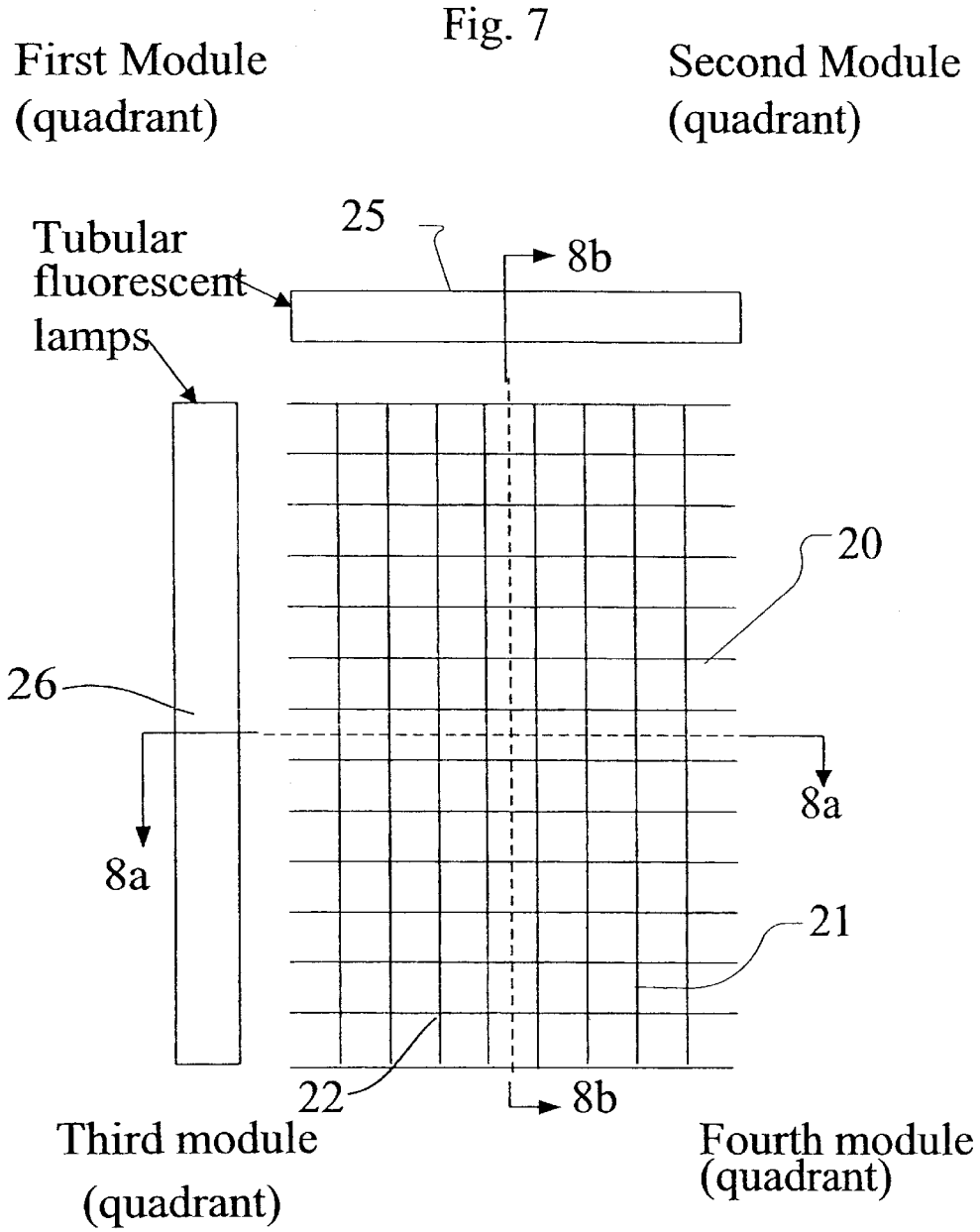
FIG. 7 illustrates a calibration grid on the combined screen used for calibrating the modular units.
Figure 8A:
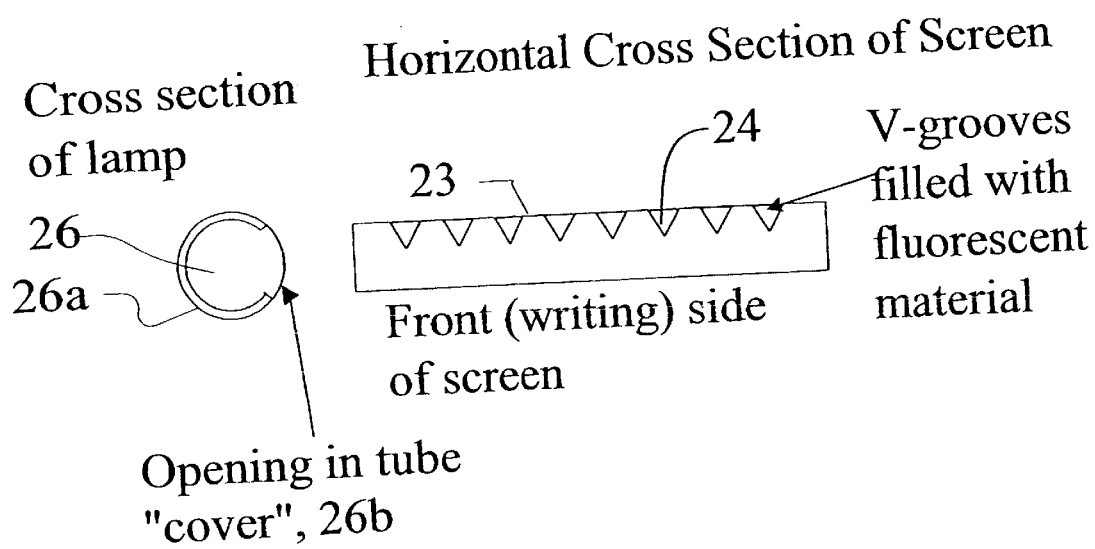
FIGS. 8a and 8b are longitudinal and transverse sectional views along lines 8a—8a and 8b—8b, respectively, of FIG. 7.
Figure 8B:
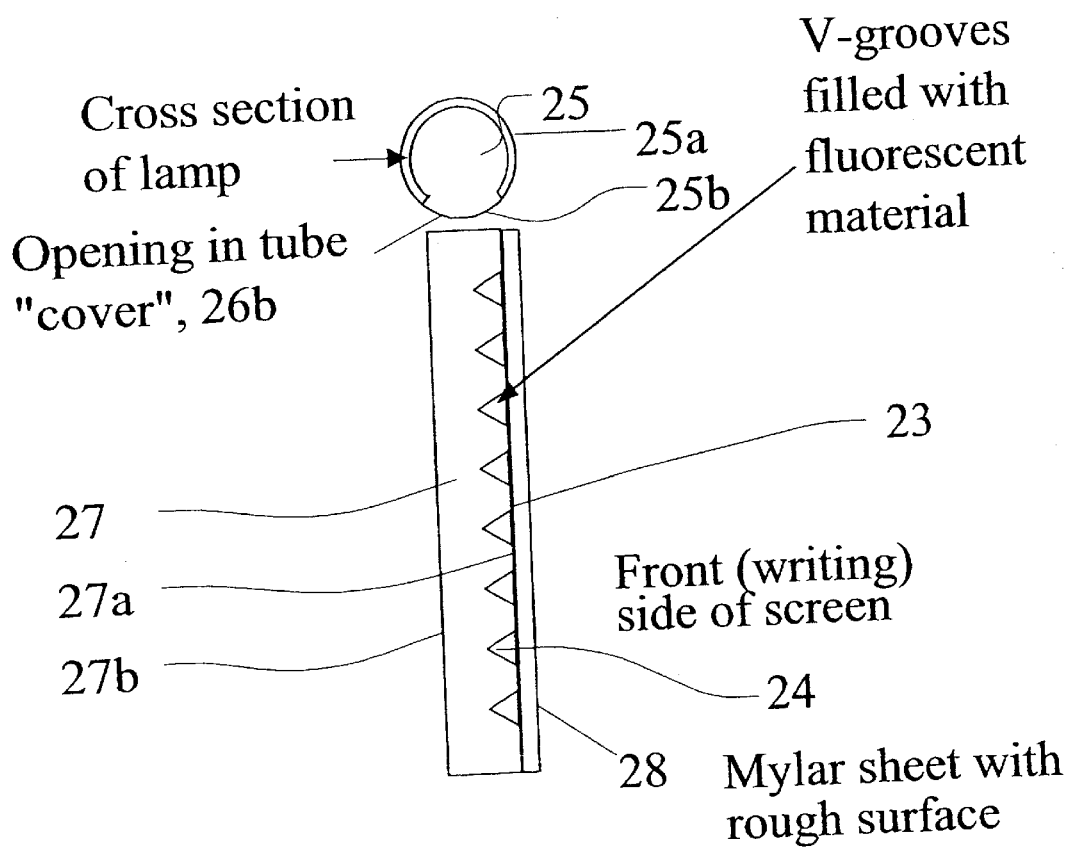

The built-in calibration system illustrated in FIG. 7 includes a plurality of horizontal reference lines 20 and a plurality of vertical reference lines 21 formed on the face of the combined screen 2 such that the intersection points of the two groups of reference lines define a two-dimensional array or grid of reference points 22 of precisely-known locations on the face of the combined screen 2. As shown in FIGS. 8*a* and 8*b*, the reference lines 20 and 21 are produced by forming V-grooves 23 on the face of the combined screen 2 and filling the grooves with a luminescent material 24 which is excited by a horizontal light source 25 extending along one edge (the upper edge) of the combined screen 2, and a vertical light source 26 extending along one side (the left side) of the combined screen. Each of the two light sources 25, 26 is enclosed by a reflector 25a, 26a, formed with an opening 25b, 26b, facing the combined screen 2 so as to direct the light towards the luminescent material 24 carried by the combined screen. Preferably, the luminiscent material 24 is an ultraviolet (UV) fluorescent material, and the light sources 25, 26 are UV light sources which cause the material 24 to fluoresce.

As one example, the combined screen 2 may be constructed of a rigid light transmissive (translucent) panel 27 formed on its inner face 27a with the V-grooves 23 filled with the luminescent material 24 defining the grid of reference lines 20, 21, the opposite face 27b of the transparent panel serving as a write-on surface by a user. The combined screen 2 further includes a flexible plastic sheet 28, e.g., of "Mylar" sheet material having a rough surface, covering the grooved face 27a of the transparent panel 27 and the luminescent material 24 within the V-grooves 23.

The two-dimensional array of reference points 22, defined by the intersections of the horizontal and vertical lines 20, 21, is used for detecting and correcting distortions caused by the optical systems in each modular unit, as described more particularly below.

Figure 9:
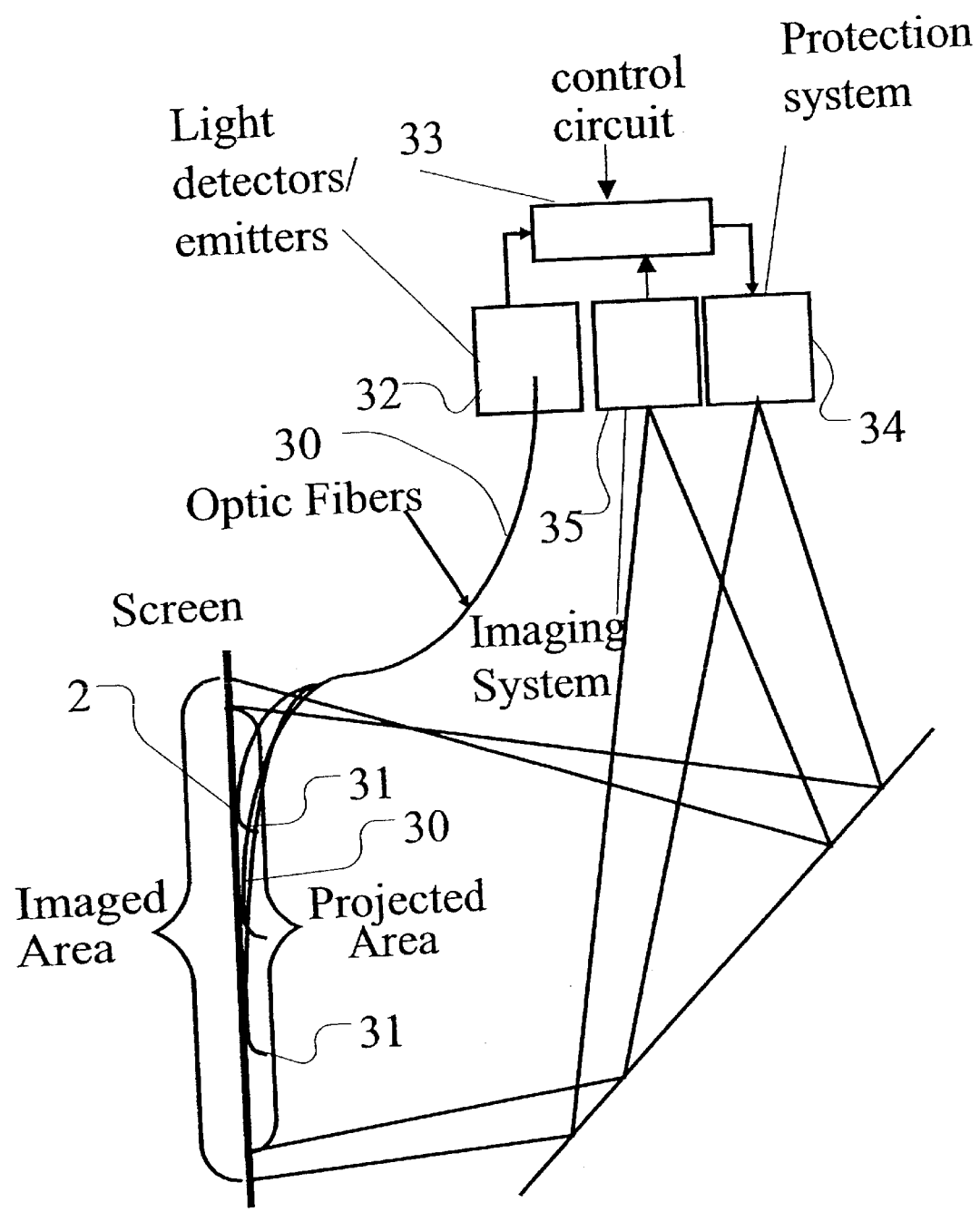
FIG. 9 diagrammatically illustrates one technique for correcting non-uniformity in light intensity in the modular units.

FIG. 9 diagrammatically illustrates a technique that may be used for calibrating for non-uniformity in the light intensity of the modular units $M_1-M_4$. For this purpose, the combined screen 2 is provided with a plurality of optical fibers 30 having one of their ends 31 located on the inner face of the combined screen 2 to sense the light intensity at the respective location. The opposite end of each optical fiber 30 is connected to a light detector 32 producing an output corresponding to the light intensity at the respective location 31. The outputs of light detectors 32 are connected to a control circuit 33 which controls the intensity of the light sources in the rear projectors (5, FIG. 2), constituting the projection system designated by block 34 in FIG. 9, so as to reduce non-uniformity in the light intensities of the light sources in the modular units. The imaging system 35, including the light sensors 8 of the modular units, is separate from the projection system 34, similar to the arrangement of FIG. 5, and also controls the control circuit 33.

FIG. 10 illustrates another technique that may be used for detecting and correcting not only distortions in the optical systems of the respective modular units $M_1-M_4$, but also non-uniformity in the light intensities of the projector devices in these modular units. As shown in FIG. 10, combined screen 2 includes a plurality of optical fibers 41 having one of their ends 42 embedded in the face of the combined screen at precisely-known locations to define the two-dimensional array of reference points of known locations on the face of the combined screen. The opposite end of each optical fiber 41 is connected to a light emitter 43 (e.g., a LED), and also to a light sensor 44 (e.g., a photodetector) via a beam splitter cube 45. The light emitter 43 and light sensor 44 of each optical fiber 41 are connected in parallel so as to be selectively enabled.

Thus, when the optical fibers 41 are to be used for producing the two-dimensional array of reference points 42 (corresponding to reference points 22 in FIG. 7), the light emitters 43 of the optical fibers 41 are energized; and when the optical fibers 41 are to be used for detecting and correcting non-uniformity in light intensity of the rear projectors in the modular units, the light sensors 44 are enabled.

Operation

Overall Operation

One manner in which the above-described calibration systems are used for detecting and correcting distortions in the optical systems of the several modular units, and also non-uniformity in the light-intensity levels of the modular units, will now be described, for purposes of example only, with reference to the diagrams of FIGS. 11a–13 and the flowcharts of FIGS. 14–18.

Figure 14:
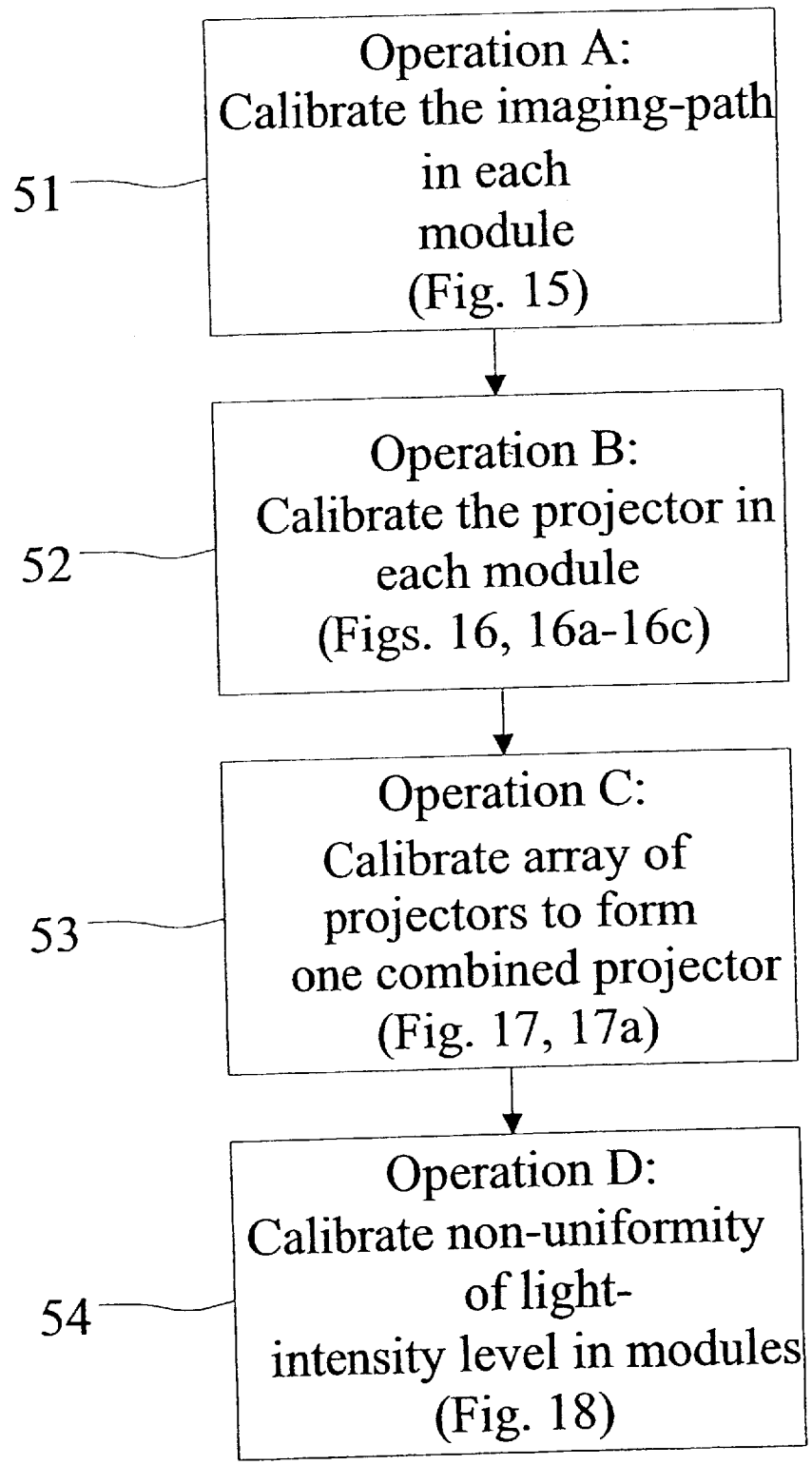
FIG. 14 is a flowchart illustrating one example of the overall calibration technique, constituted of the four operations, A, B, C and D.

FIG. 14 is a general flowchart illustrating the overall calibration technique. The calibration is constituted of four main operations, designated Operations A, B, C and D, respectively, as appearing in blocks 51–54.

Operation A, block 51, involves the calibration of the imaging path in each module. In this operation, the distortions in the optical imaging system, from the screen 2 to the image sensor 8 in the respective module, are detected and corrected by the graphics computer 6 of the respective module. This operation is more particularly illustrated in the flowchart of FIG. 15.

Operation B, block 52, involves the calibration of the projector path in each module. In this operation, distortions in the optical projection system, from the rear projector 5 to the screen 2, are detected and corrected also by the graphics computer 6 of the respective module. This operation is more particularly illustrated in the flowcharts of FIGS. 16, 16a, 16b and 16c.

Figure 17:
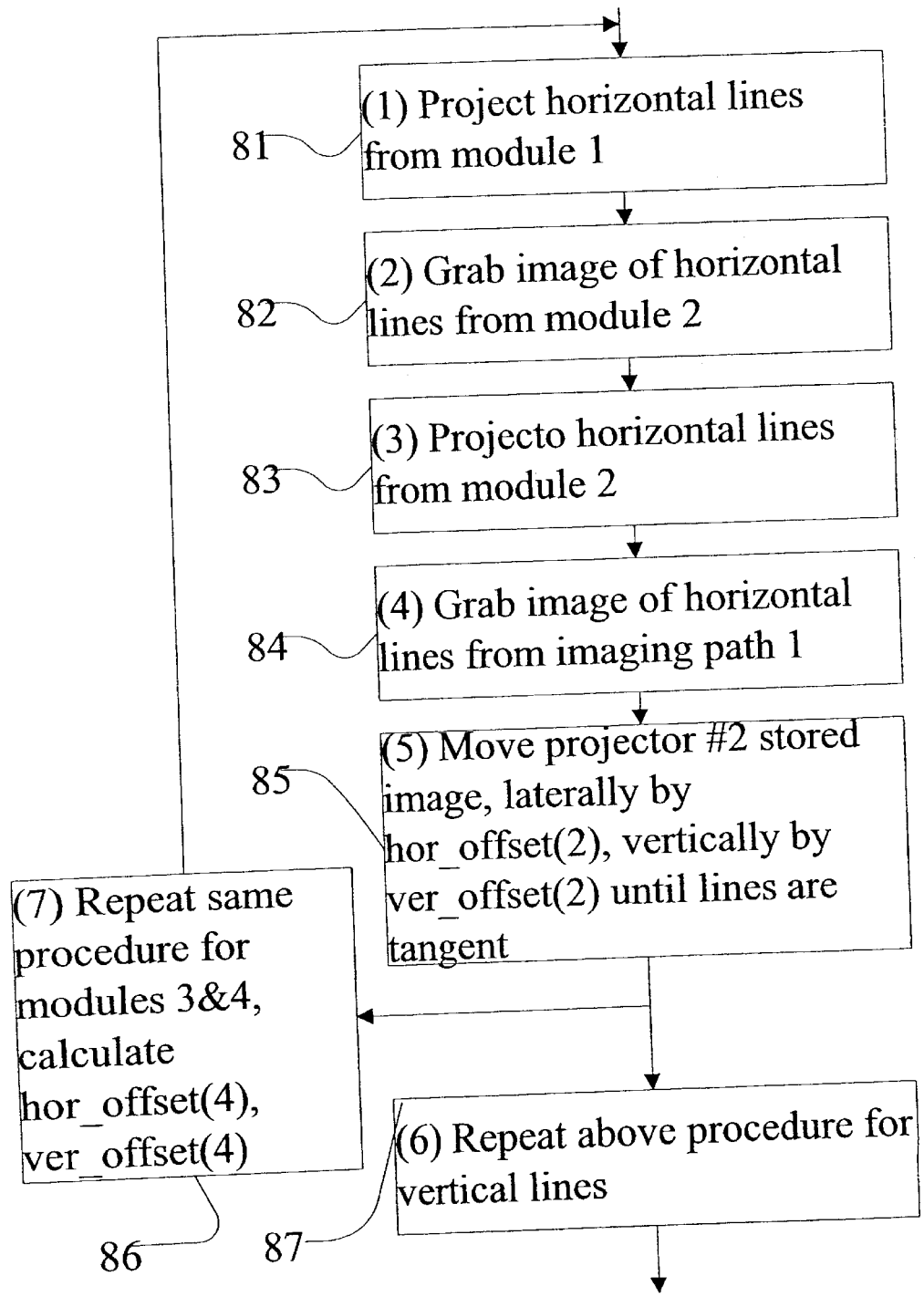
FIGS. 17 and 17a taken together, constitute a flowchart illustrating operation C in FIG. 14.
Figure 17A:
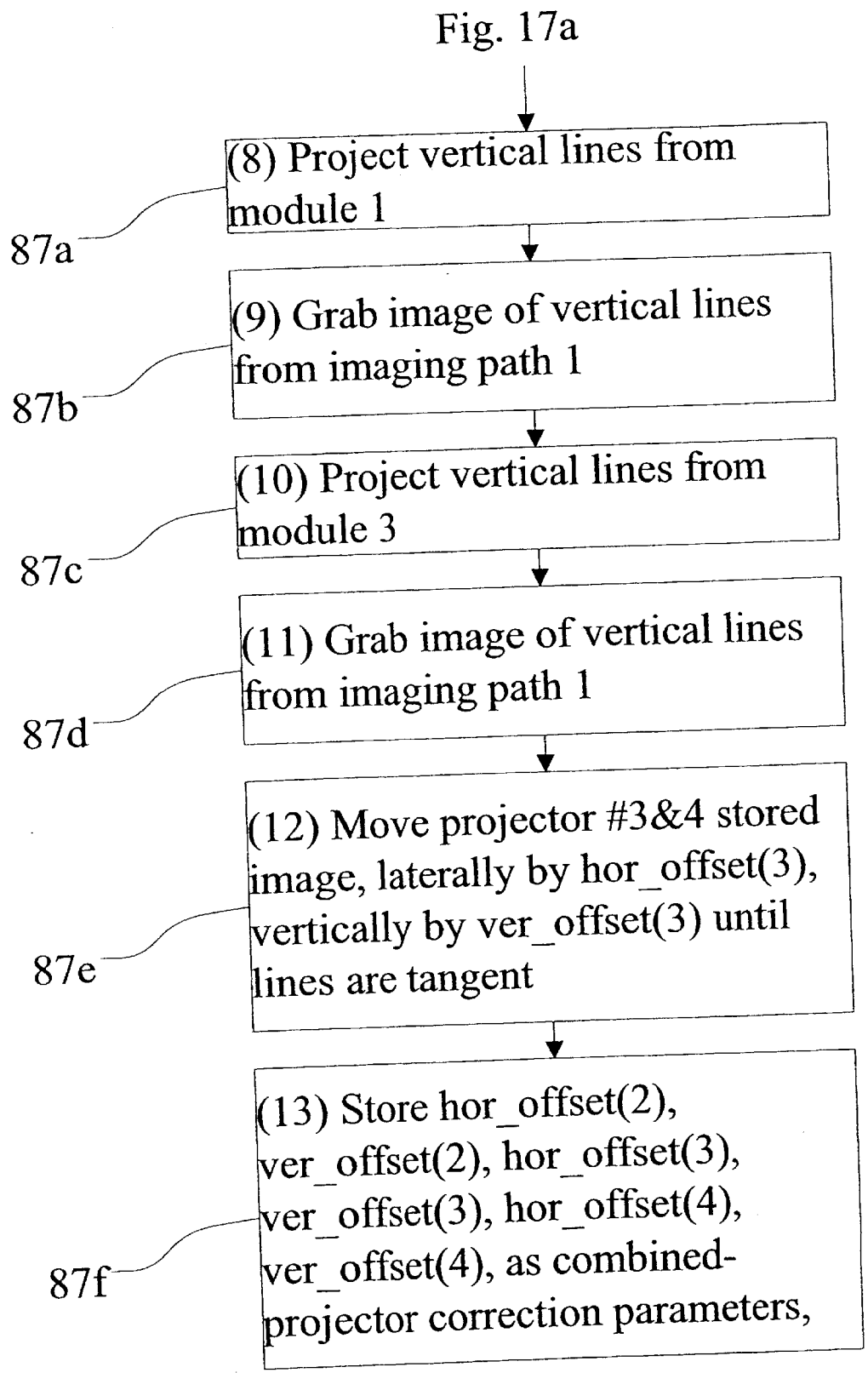

Operation C, block 53, involves the calibration of the array of projectors in the plurality of modular units $M_1-M_4$ to fine-tune the combined image projected on the combined screen 2, including eliminating overlaps and gaps between the displays in each of the modules caused by distortions in the optical systems. This operation as well as the other previously-described distortion-correction operations, is performed by the graphics computer 6 in the respective modules $M_1-M_4$, and also by the systems computer SC which controls all the modules, and is illustrated in the flowcharts of FIGS. 17 and 17a.

Figure 18:
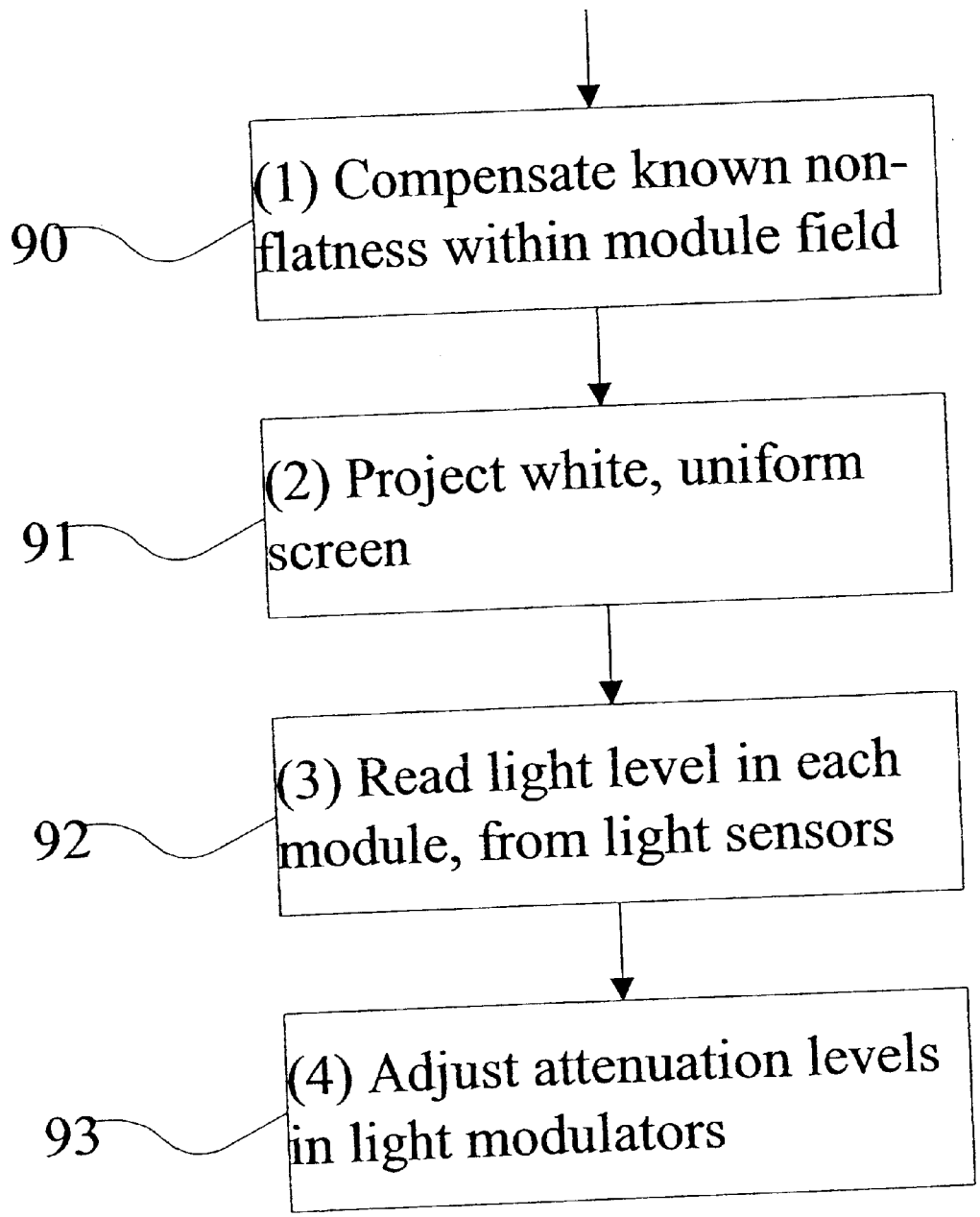
FIG. 18 is a flowchart illustrating operation D in FIG. 14 for correcting non-uniformity in light intensity between the various modular units.

Operation D, block 54, involves the calibration for non-uniformity in light intensity levels among all the modules. In this operation, the light intensity levels of the images projected on the combined screen from all the modular units are detected and controlled to reduce non-uniformity. This operation is also performed by the graphics computer 6 of the modular units, as well as by the systems computer SC controlling all the modular units, and is illustrated in the flowchart of FIG. 18.

Figure 15:
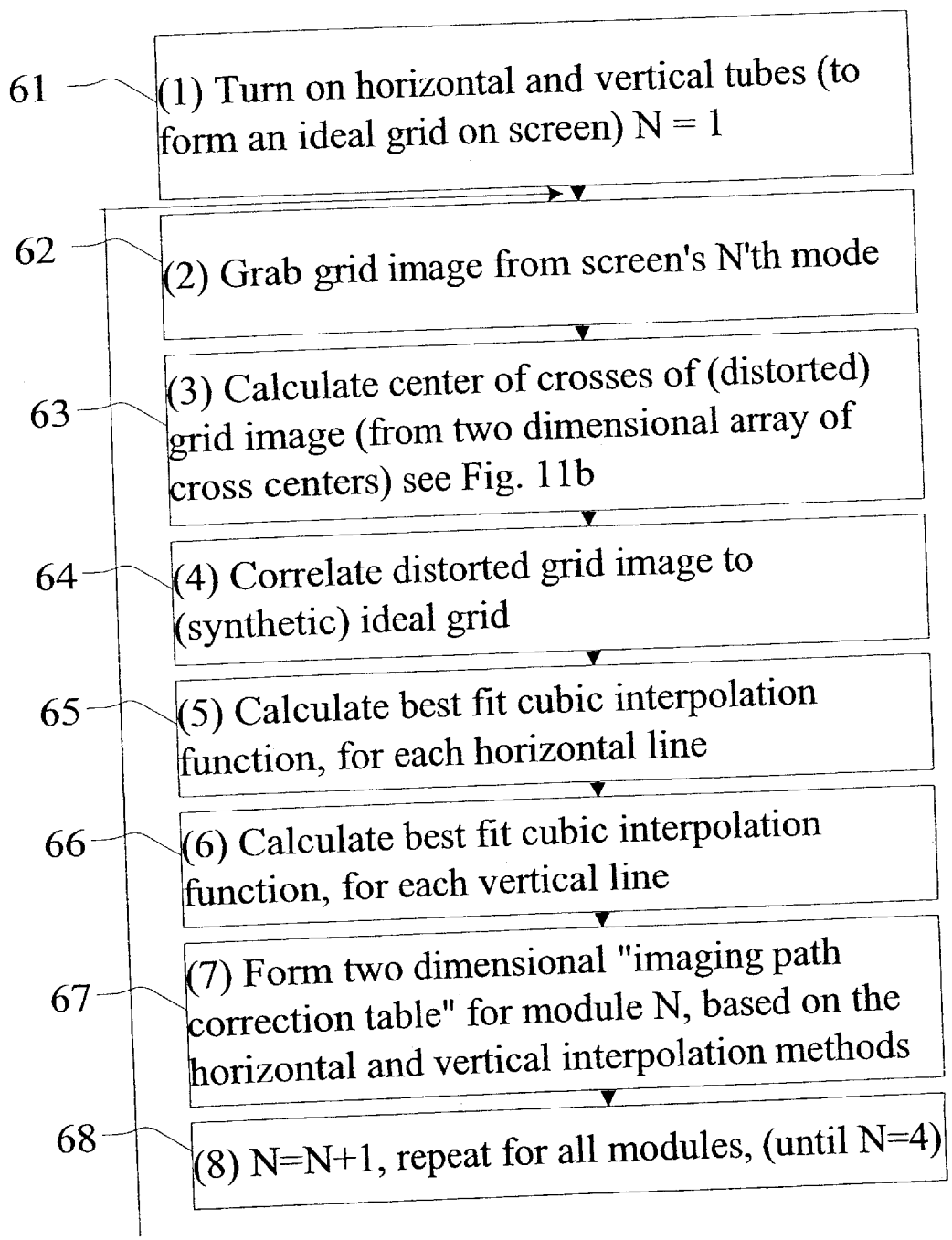
FIG. 15 is a flowchart illustrating operation A in FIG. 14.

Operation A (FIG. 15)

As shown in the flowchart of FIG. 15 illustrating Operation A (block 51, FIG. 14), the first step is to energize the two tubes 25, 26 (FIG. 7) of the first modular unit $M_1$ in order to produce in that modular unit the visual reference lines 20, 21 (FIG. 7) defining, at their intersections 22, the two-dimensional array of reference points of known locations on the face of the combined screen 2. This step is indicated by block 61 in FIG. 15. The ideal grid produced by these reference lines is shown by horizontal lines $HL_0-HL_6$ and vertical lines $VL_0-VL_6$, respectively, in FIG. 11a.

Figure 11A:
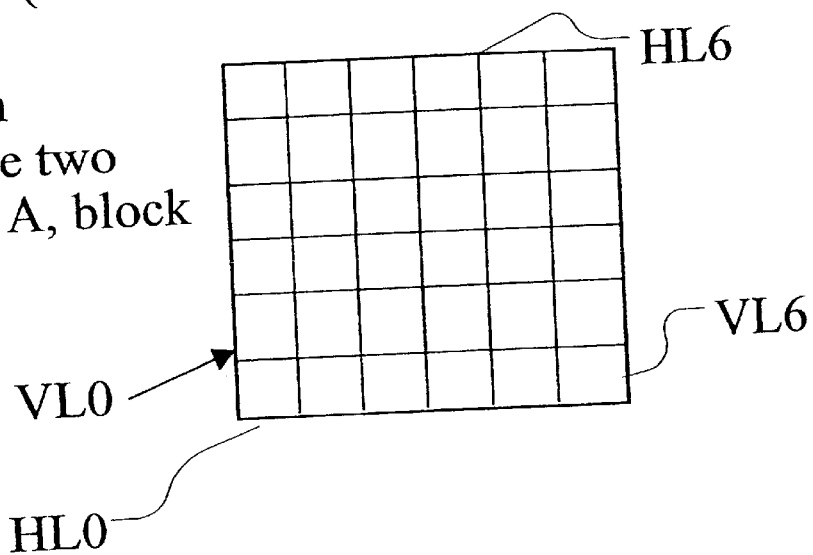
FIGS. 11a and 11b diagrammatically illustrate one technique for correcting spatial distortions in the imaging systems of the modular units.

The image sensor 8 in the respective module grabs the image produced on the combined screen 2 for the respective module (block 62). However, because of the distortions caused by the optical system in the imaging path from the screen 2 to the image sensor 8, the actual image "seen" by the image sensor is not the ideal grid illustrated in FIG. 11a, but rather the distorted grid illustrated in FIG. 11b. That is, whereas all the horizontal and vertical lines in the ideal grid of FIG. 11a are straight and perpendicular to each other, in the distorted grid illustrated in FIG. 11b all the horizontal lines $HL_0-HL_{6'}$ and vertical lines $VL'_0-VL'_6$ (except lines $HL_3$ and $VL_3$ along the longitudinal axis and the transverse axis TA) are distorted because of the inherent distortions of the imaging-path optics. These distortions increase with the distance of the respective line from the longitudinal axis LA and transverse axis TA.

Figure 11B:
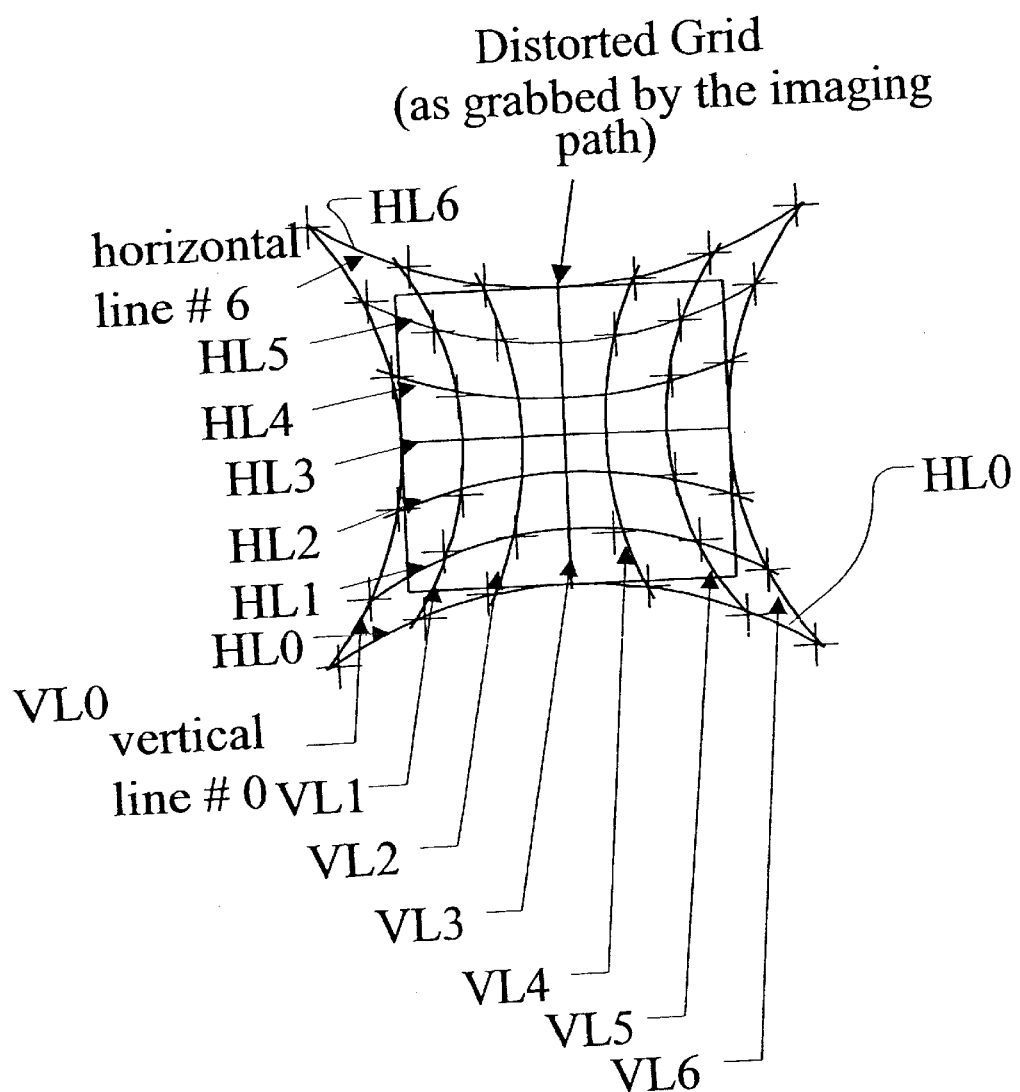

The intersection points of the horizontal and vertical reference lines, defining the two-dimensional array of reference points, are determined in the distorted grid of FIG. 11b (block 63), and are correlated with the known locations of the reference points in the ideal grid of FIG. 11a (block 64). The graphics processor 6 for the respective module then calculates a two-dimensional, best-fit cubic function for transforming the intersection points of the distorted grid to those of the ideal grid. Such calculations are well known; see for example "Image Reconstruction by Parametric Cubic Convolution" by Stephen K. Park and Robert A. Schowengerdt, published in "Computer Vision, Graphics and Image Processing" 23, 258–272. This procedure is performed for each horizontal pair of lines (box 65), and for each pair of vertical lines (box 66).

A two-dimensional Image-Path Correction Table is then produced and stored in the graphics computer 6 for the respective module for each of the reference points in two-dimensional array reference points (block 67). The foregoing steps are then repeated $N_2$–$N_4$ for all the remaining modules $M_2$–$M_4$ (block 68).

The result of blocks 65 and 66 is a set of distortion functions for each horizontal line 20 and each vertical line 21 of the stored ideal grid (FIG. 7), i.e., seven (in the described example of FIG. 11a) horizontal functions and seven vertical functions. The Image-Path Correction Table calculated in block 67 is a correction table which enables the system hardware to convert the grabbed distorted images of the imaging path into distortion-free images.

The above-described technique for performing Operation A has a number of advantages, including the following: The calculation of a best-fit function filters out (smoothes) any local noise generated by the imaging path, or local error in the reference grid. In addition, the calculation of a cubic function for each reference line enables determination, by interpolation, of all the other points that are not on the reference grid. In addition, the representation of the distortation data by a cubic function (as distinguished from a table) enables handling and storing the data in a more compact manner.

Operation B (FIGS. 16, 16a, 16b, 16c)

FIG. 16 illustrates the steps of Operation B (block 52, FIG. 14) involving the calibration of the projector path in each module. This operation detects the distortions produced in the projector path optics, i.e., from the rear projector 5 of the respective module to the combined screen 2, and produces a Projector Path Correction Table for correcting these distortions.

Thus, as shown in FIG. 16, the stored ideal grid (FIG. 11a) is projected onto the combined screen 2 (block 71), which image is distorted by the projector path optics. The projected image is partially reflected from the screen onto the image sensor (8, FIG. 2) of the respective module (block 72), which grabbed image is distorted by the distortions in the imaging-path optics. This distorted image of the grid is illustrated in FIG. 11b.

Figure 16A:
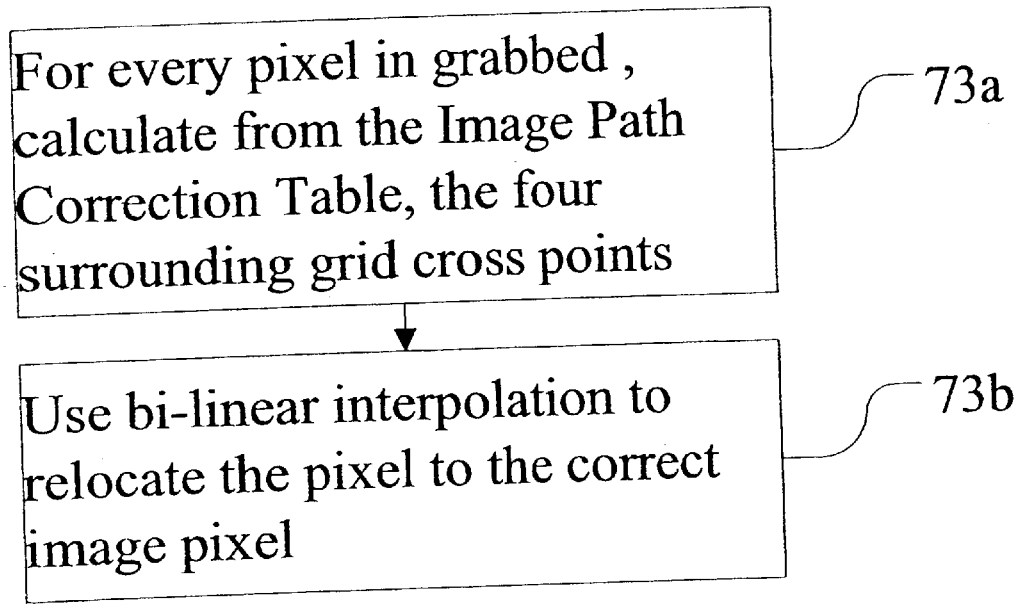
FIGS. 16a, 16b and 16c are flowcharts illustrating certain sub-operations of operation B.

The graphics processor (6, FIG. 2) of the respective module corrects the intersection points (reference points) in the distorted grid (block 73) according to the flowchart illustrated in FIG. 16a. Thus, as shown in FIG. 16a, for every pixel in the grabbed image, a calculation is made from the Image-Path Correction Table (produced in Operation A according to the flowchart of FIG. 15) of the four surrounding grid reference points; and then by using bi-linear interpolation (block 73b), each such pixel is relocated to the correct location.

Figure 12A:
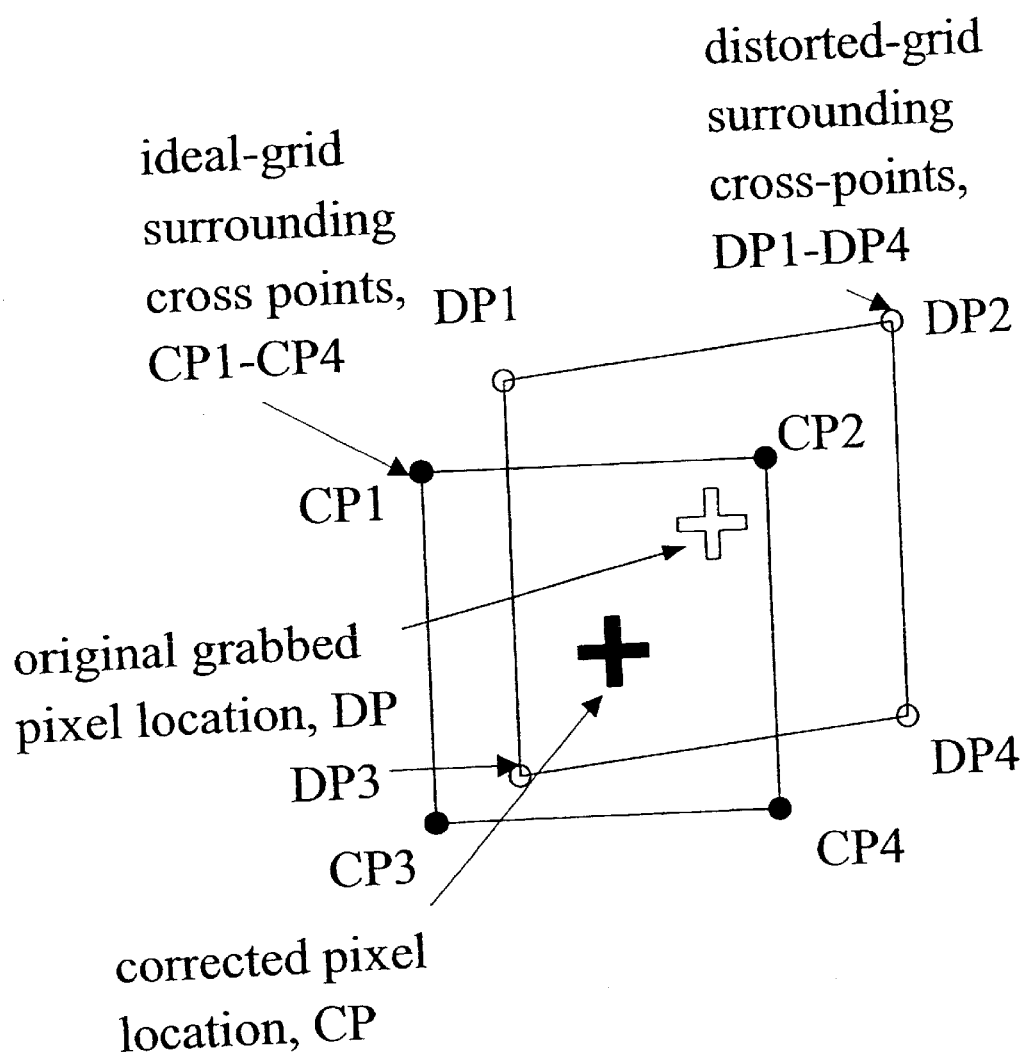
FIGS. 12a and 12b diagrammatically illustrate one technique for correcting spatial distortions in the imaging-path optical system, and in the projector optical systems, respectively, of the modular units.
Figure 12B:
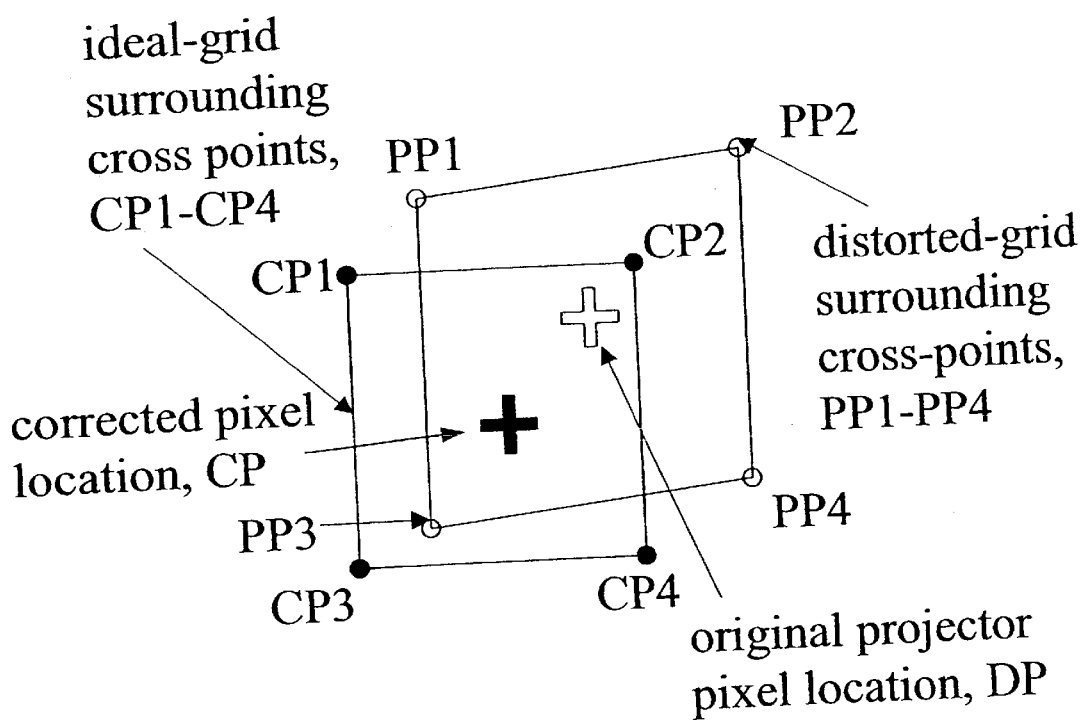

The steps of blocks 73a, 73b in the flowchart of FIG. 16a are more particularly illustrated in the diagram of FIG. 12a. Thus, the location of the distorted pixel in the distorted grid is indicated at DP, and the locations of the four surrounding pixels in the distorted grid are indicated at $DP_1$–$DP_4$. The locations of the corresponding four pixels on the ideal (corrected) grid are indicated at $CP_1$–$CP_4$; and the corrected location of the corresponding pixel is indicated at CP.

Following the steps indicated by block 73 in FIG. 16 (and blocks 73a, 73b in FIG. 16a), the graphics computer of the respective module has now an image of the projected screen that is free of the distortions of the imaging-path optics, and includes only the distortions of the projection-path optics.

A Projection-Path Correction Table is then calculated for the projection path optics (block 74). The Projector-Path Correction Table provides, for every ideal-grid reference location, the correct locations of the projected reference points in the distorted grid. The manner in which the Projector-Path Correction Table (block 74) is calculated is more particularly illustrated by steps 74a–74f in FIG. 16b.

Figure 16C:
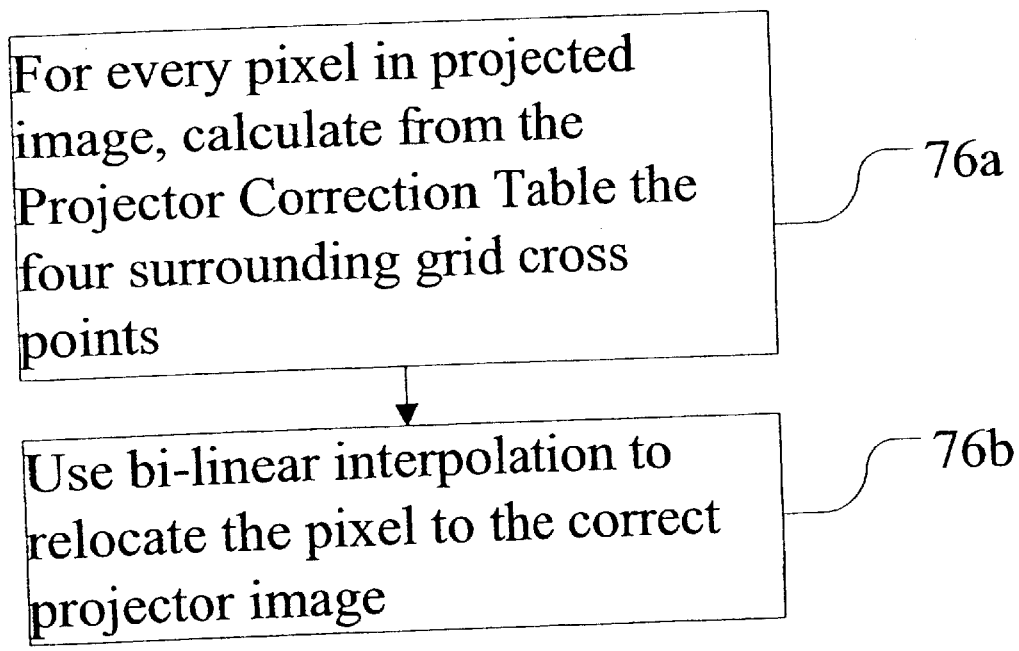
Figure 16B:
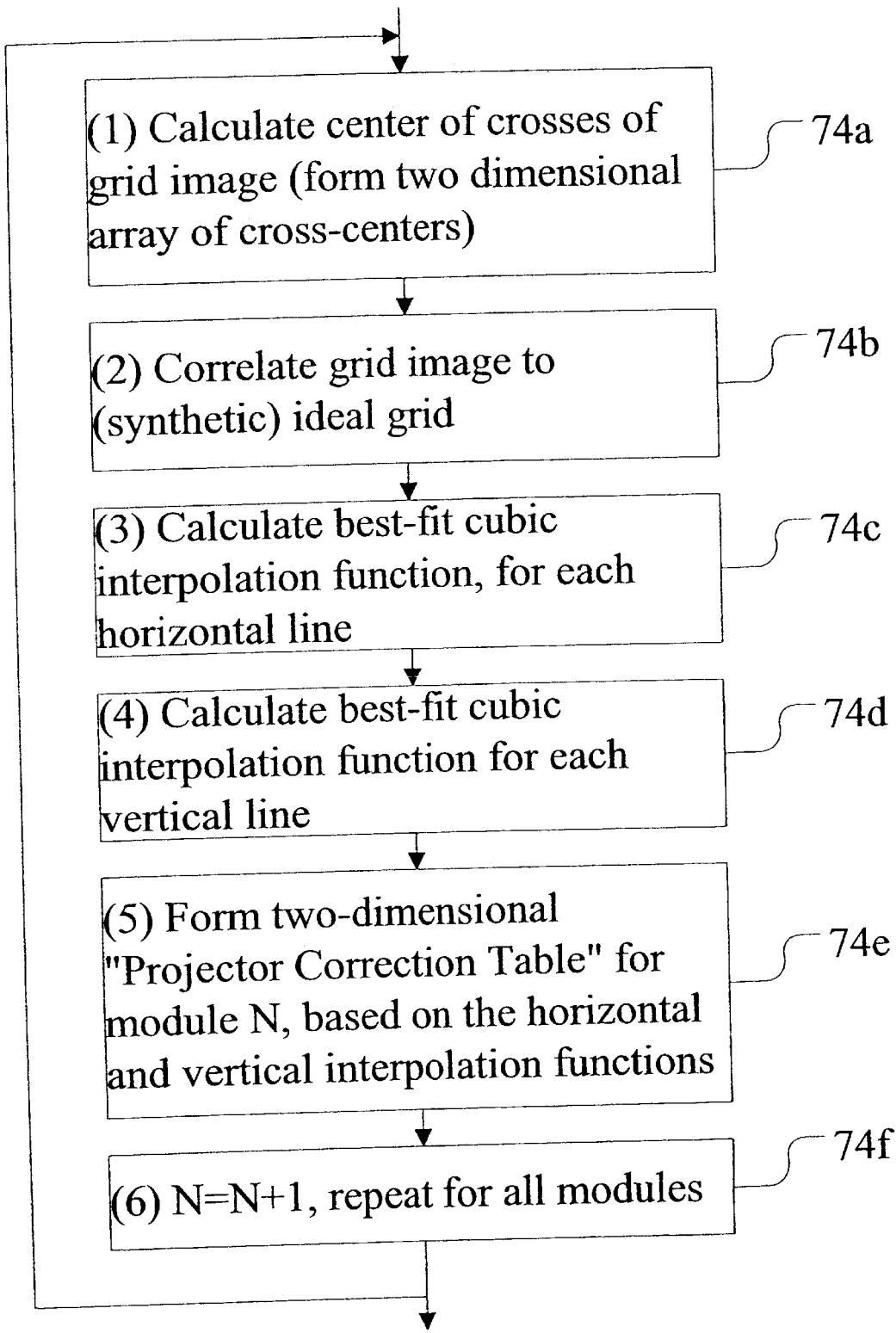

As shown in FIG. 16, a check is made as to whether the distortion is smaller than the threshold (block 75). If not (i.e., the distortion is larger than the threshold) the correct location of the reference point is determined and stored according to the flowchart illustrated in FIG. 16c and the diagram of FIG. 12b.

Thus, for every pixel in the projected image (PP, FIG. 12b) a determination is made from the Projector-Path Correction Table of the four surrounding grid reference points $PP_1$–$PP_4$ (blocks 76a, FIG. 16c). By using bi-linear interpolation (block 76b), the corresponding points $CP_1$–$CP_4$ on the ideal correct grid are determined for relocating the pixel to the correct location CP (block 76b).

After the above-described distortion calibration has been completed for the projector path of the respective module (block 76), the procedure is repeated with respect to the other three modules $M_2$–$M_4$ (block 77). Upon the completion of Operation B for all the modulator units, the projector of each modular unit is now corrected for distortions in their optical systems.

Operation C (FIGS. 17, 17a)

Figure 13:
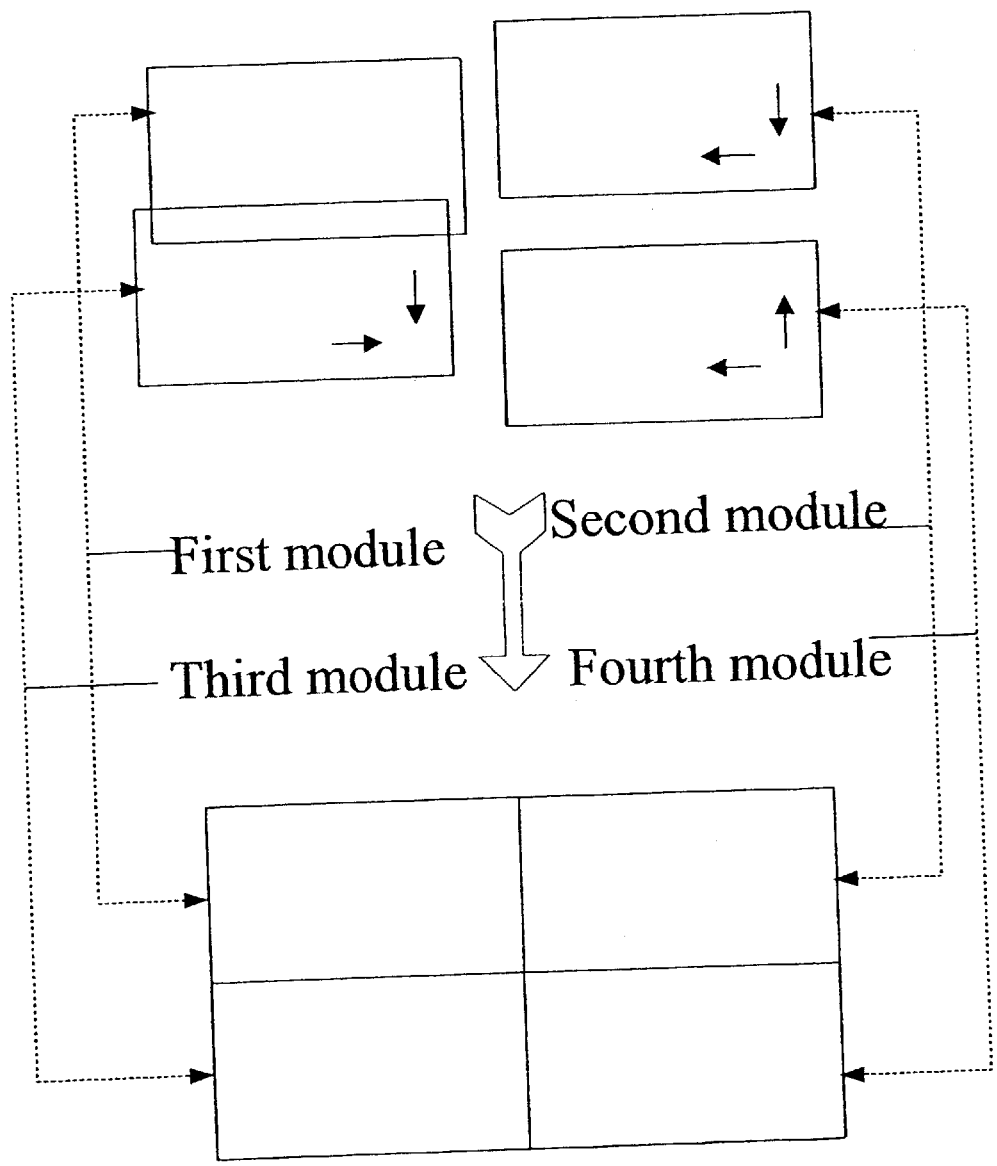
FIG. 13 diagrammatically illustrates one technique for eliminating overlaps and gaps between the displays in the screens of the plurality of modular units.

Operation C (block 53, FIG. 14) is now performed to calibrate the array of projectors to form one combined projector image. In this operation, the projector displays of the four modular units are treated as four tiles with parallel coordinate systems on the plane of the combined screen 2, and are electronically moved vertically and horizontally until they cover the face of the combined screen 2 with no overlaps and no gaps. This operation is more particularly described in FIGS. 17 and 17a, and is illustrated in the diagram of FIG. 13.

Thus, as shown in FIG. 17, the horizontal lines are projected from the first module (block 81), and the image of the horizontal lines from the imaging path of the first module is grabbed (block 82). The horizontal lines from the second module are then projected (block 83), and the image of the horizontal lines from the imaging path of the first module are grabbed (block 84). The location of the stored image in the projector of the second module is then moved laterally by a horizontal offset, and vertically by vertical offset, until the lines are aligned (block 85). The foregoing steps are repeated for the third and fourth modules by calculating the horizontal offset and vertical offset for these modules (block 86).

The same procedure is then repeated for the vertical lines (block 87), as more particularly set forth in the flowchart of FIG. 17a, where the corresponding steps are indicated by blocks 87a–87f.

Operation D (FIG. 18)

Upon the completion of Operation C (block 53, FIG. 14), Operation D is performed (block 54, FIG. 14) for detecting and correcting non-uniformity in the light intensity among all the modules. This operation is more particularly illustrated in the flowchart of FIG. 18, and uses the light intensity detectors (optical fibers 30 of FIG. 9, or 41 of FIG. 10) for this purpose.

In calibrating for non-uniformity in illumination on the combined screen 2, the following assumptions are made:

1. Illumination differences between the modules are global in nature, meaning that the non-uniformity profiles of the modules are similar in shape, but non-similar in amplitude. The difference between the ampliudes is a result of differences in the brightness of the lamps in each module and differences in the optical attenuation of each module.

2. The variation of illumination within each module are gradual at very low spatial frequency.

3. The non-unformity of the illumination of the screen of each module may behave according to a known physical behavior, e.g., according to the following:

$$I = k^* \cos(0)^{**}4 \qquad \text{Eq. 1}$$

wherein:

I=illumination brightness on the screen as seen by the viewer;

0=angle of point on screen relative to optical axis;

k=arbitrary coefficient.

For a module with focal length=100 cm, projection area=60 cm×80 cm, the falloff in the corner of the screen is −31.4%. This falloff is very gradual and has a circular symmetry, relative to the optical axis of the module.

As shown in FIG. 18, the calibration of illumination non-uniformity involves two major steps:

1. Calibration of known non-uniformity (e.g., as described above) within each module's field.

This non-uniformity will be corrected, for each module, by adjusting the gray level of each module stored image. The adjustment of the gray level uses the light-modulator's capacity to modulate its transparency in an almost continuous way. As an example, assume that a uniformly white field is to be projected on the entire module's screen, having the parameters mentioned in assumption (3), and that the light modulator has 256 gray levels. The graphics processor will generate an image which has a value of 255*(1−0.314), or 175 gray levels in the middle pixels of the screen, and 255 in the corner pixels. The gray level of the other pixels will be calculated in accordance with Eq. 1. These values will cause the light modulator to attentuate the transmitted light in such proportion that the illumination on the module's screen will be flat (uniform) over the entire face of the screen.

The foregoing operation is implemented by blocks 90 and 91 in FIG. 18, and will be used for all modules. The result of this operation is that within each module, the screen's brightness is uniform, but the average brightness level of the modules will vary from module to module. The difference between the modules is calibrated in the next step implemented by blocks 92 and 93.

2. Calibration of differences between the modules:

As mentioned before, the assumption is that after step (1) (blocks 90, 91) of the calibration, the field of each module is uniform, but the average (DC) level of the module is different, from module to module. Therefore, in order to calibrate for differences between the modules, the system uses sensing detectors in each module which are capable of reading the average brightness level of light projected on the screen. As described above, the light sensors are comprised of optic fibers whose tips are attached to the face of the screen, shown at 31 in FIG. 9, and at 42 in FIG. 10. Each fiber tip collects a fraction of the light projected on the screen and transfers this light to the light detector. The fiber by itself interferes minimally with the projected image due to the fact that the fiber is extremely thin (around 100 $\mu$m) and the fact that only the fiber tip is close to the screen, whereas most of the fiber length is away from the screen and out of focus. The light sensors readout (of the light level projected on the screen) will be inputs to the graphics processor. The graphics processor will use this input to calculate the difference between the modules and to control the attenuation of the light modulators, as described in step (1) of the calibration.

Following is one example of a design: projector lens, El-Nikkor, f=135, f/5.6; imaging lens, Panasonic WV-Lf6; LCD panel, Sharp model LQ64P312; light source, 400 watt Tungsten-Halogen lamp. Osram HLX 64665; and graphics computer, Texas Instruments TMS320C80.

Screen Structure

Figure 19:
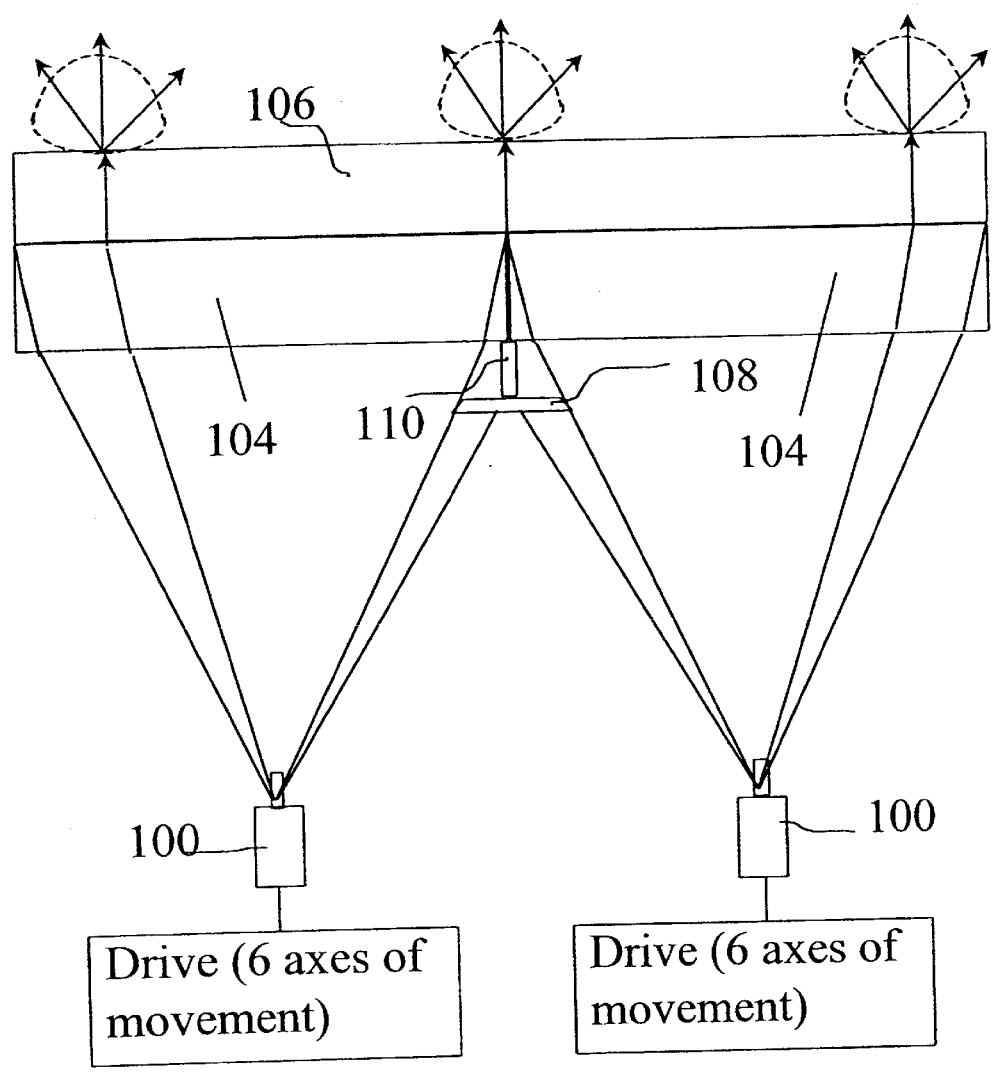
FIG. 19 illustrates electro-optical display apparatus including a plurality of projectors each equipped with a Fresnel lens, and having a common diffusive screen to produce uniformity from any viewing angle.
Figure 20:
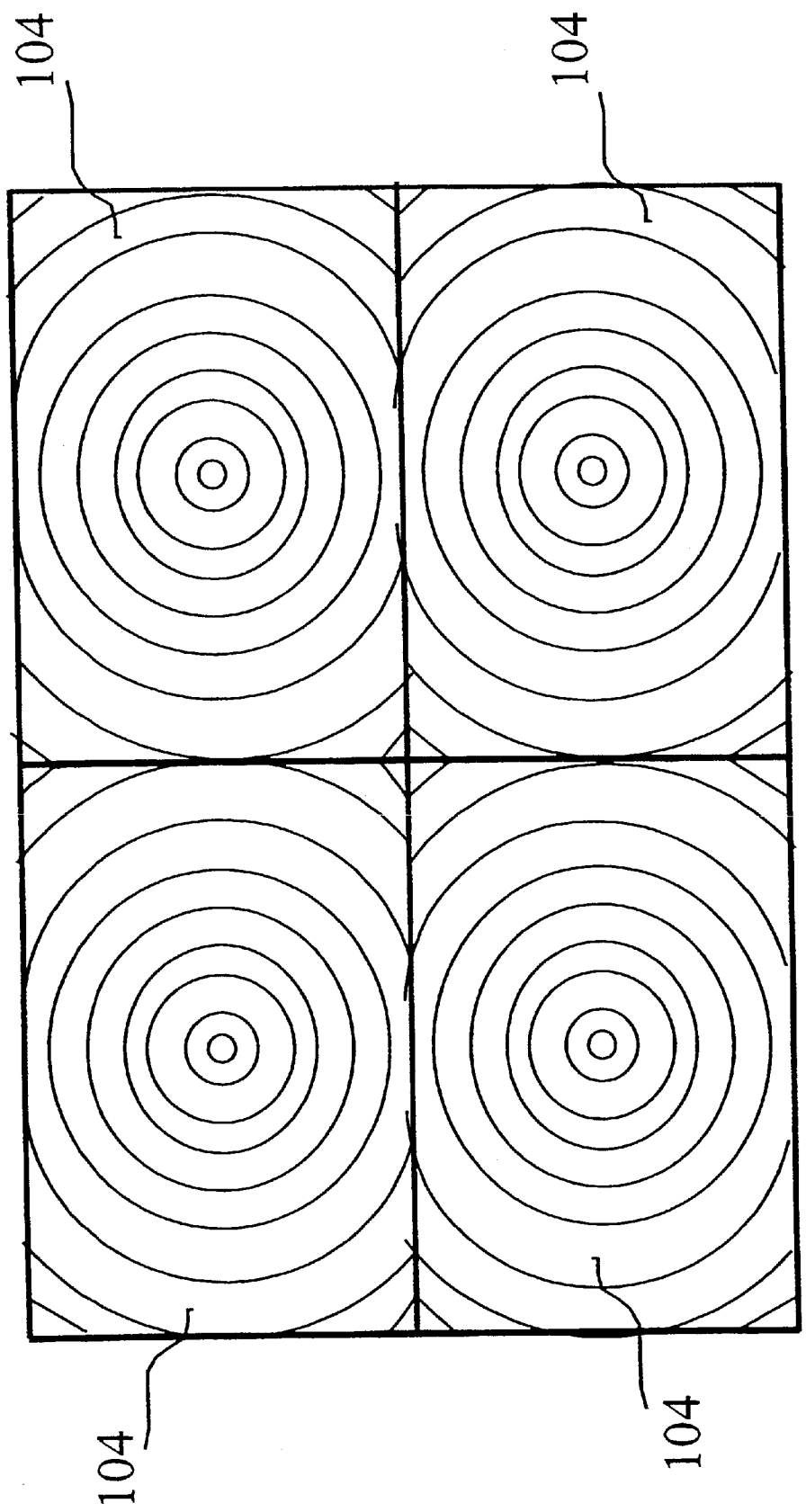
FIG. 20 is a schematic view of the Fresnel lens array in the apparatus of FIG. 19.

FIGS. 19 and 20 illustrate four projectors 100 (only two of which are seen in the top view of FIG. 19), each having a drive 102 providing six degrees of movement. Each projector includes a Fresnel lens 104 which collimates the light from the respective projector. All the Fresnel lenses are covered by common screen 106, e.g. constructed with a lenticular or a diffusing surface, for scattering the light and thereby providing more uniformity from any viewing angle. A blocking element 108 is mounted by a member 110 to underlie the junctures between adjacent Fresnel lenses 104 in order to reduce overlapping of the light from the projectors and thereby to produce a seamless combined display.

Correcting Distortions Mechanically

The following distortions can be corrected mechanically or optically:

1. straightness distortions and overlap gaps both resulting from the Pin Cushion (PC) and barrel distortions;

2. keystone effect;

3. magnification differences between adjacent projectors;

4. rotation distortion; and 5. translation distortion.

Figure 21C:
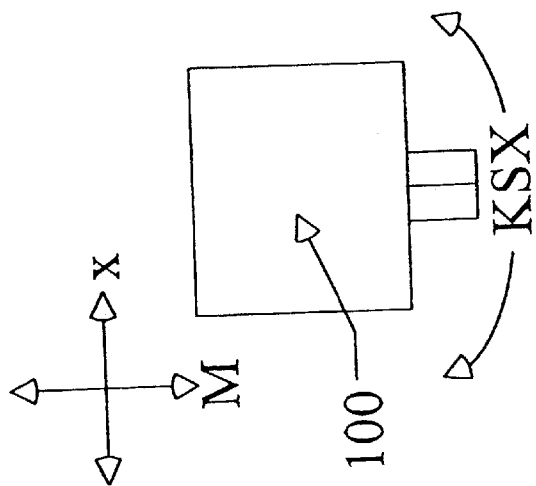
FIGS. 21a, 21b and 21c, diagramatically illustrate the front, side and top of a projector provided with mechanical means for making some of the mechanical corrections as an alternative to digital corrections.
Figure 21B:
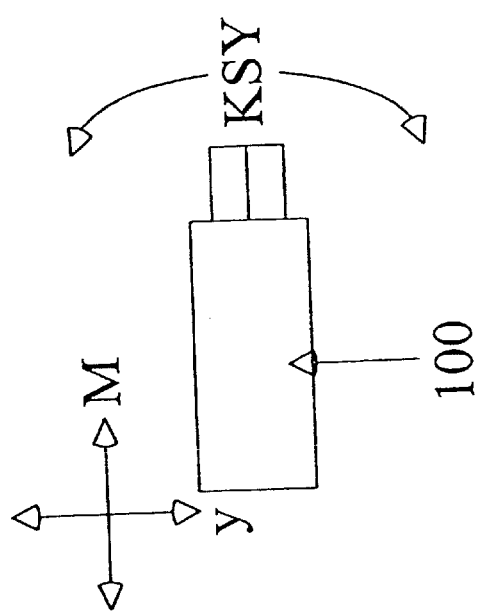
Figure 21A:
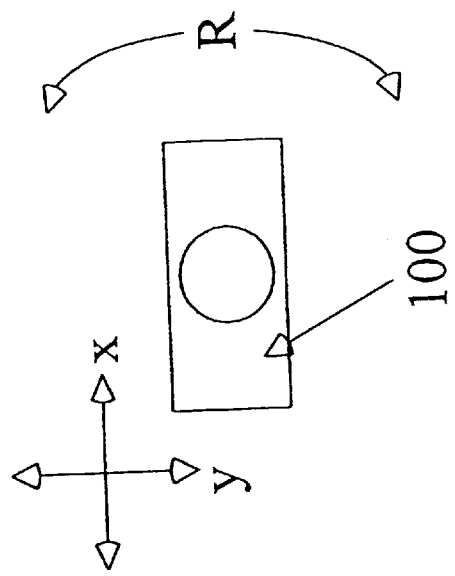

FIGS. 21a–21c also illustrate how the drives 102 of the projectors 100 can be controlled for correcting translation distortions (x, y), rotation distortions (R), magnification distortions (M), and also distortions due to the Keystone effect ($KS_x$, $KS_y$). Pin cushion (PC) and barrel distortions can be corrected by using curved mirrors, e.g. for one or more of the folding mirrors 15a–15c in FIG. 4. Color convergence distortions, however, may be corrected digitally by moving the respective pixel elements the required sub-pixel distances as described earlier.

Figure 22A:
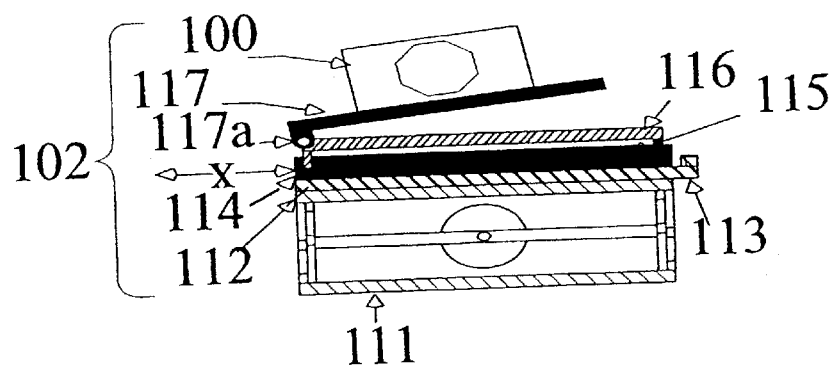
FIGS. 22a, 22b and 22c are diagrams from the front, side and top, respectively, illustrating more particularly one manner of making some of the mechanical corrections of FIGS. 21a–21c.
Figure 22B:
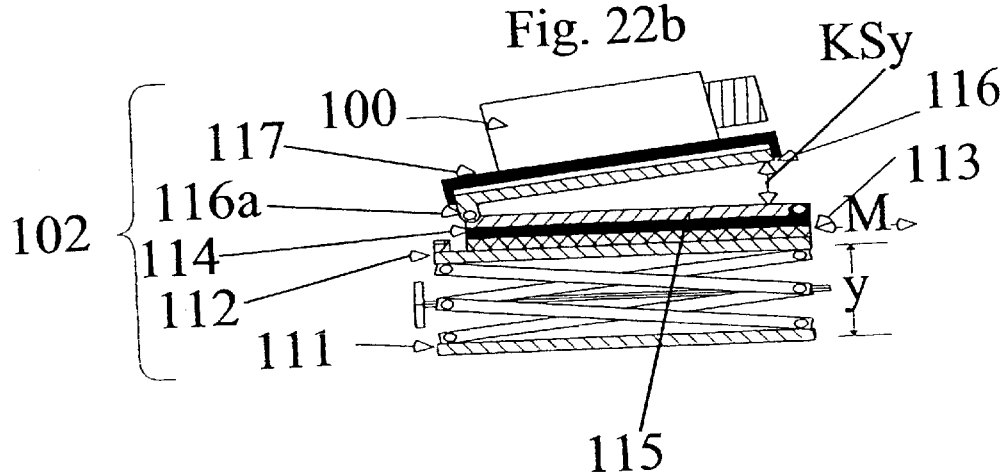
Figure 22C:
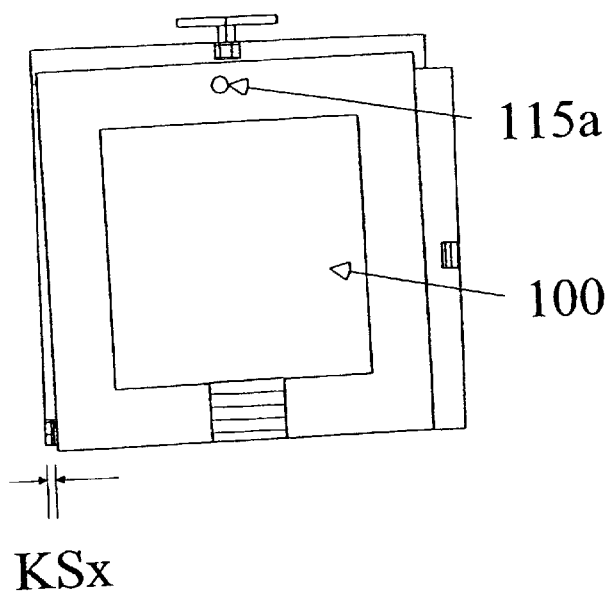

FIGS. 22a–22c are front, side and top views, respectively illustrating one manner of providing each projector drive 102 with six degrees of movement. Thus, the arrangement illustrated in FIGS. 22a–22c includes seven plates 111–117 supported one on top of the other, the upper most plate 117 supporting the projector 100. Plate 112 is movable vertically with respect to plate 111 to correct for y-translation distortions; plate 113 is slidable horizontally on plate 112 to correct for magnification differences (M); plate 114 is movable on plate 113 along the x-axis to correct for X-translation distortions (X); plate 115 is pivotally mounted to plate 114 about axis 115a (FIG. 22c) to correct for the Keystone distortions KSy; plate 116 is pivotally mounted about a central axis 116a to plate 115 to correct for the Keystone distortions KSy; and plate 117 is pivotal about pivot 117a to plate 116 to correct for rotational distortions (R).

FIGS. 23a–23c illustrate different camera positionings with respect to the screens (preferably normal to the screen in a symmetric way) for the four projectors. Thus, FIG. 23a illustrates four cameras 121–124 each located to image the center of the respective projector screen 131–134; FIG. 23b illustrates the four cameras 141–144 located to image the edges of the four screens 151–154; and FIG. 23c illustrates five cameras 161–165 located to image the corners of the four screens 171–174. The edge positioning arrangement illustrated in FIG. 23b, and the corner positioning arrangement illustrated in FIG. 23c, allow better distortion correction, since the same camera views more than one module image and can be centred around a more problematical region.

Correcting Color and Intensity Distortions

The correction of color distortions is done by modifying the R/G/B components of each projected pixel. Intensity uniformity correction is done by the same mechanism and is practically a side effect of the color correction mechanism. For example, if G and B (i.e. the Green and Blue components, respectively) are not changed and R (the Red component) is multiplied by 0.5, then the pixel becomes less "reddish". However, If G, B and R are all multiplied by 0.5 then the hue is unchanged but the intensity decreases.

There are two main physical reasons which cause color and intensity distortions. The first is the fact that each projector uses its own lamp to project the image, and each lamp has a unique emitted spectra signature which is determined by the exact manufacturing conditions and which is also changed over time (generally, the emitted light gets "redder" and the intensity gets lower as time evolves; this is true for metal-halide lamps which are commonly used in projectors. Thus each projector produces slightly different colors relative to its neighbours. The second reason (which mainly applies to intensity corrections) is a non-uniform light intensity (generally the center of the image is more illuminated than the outer parts) emitted from the projector due to the internal optical system.

There are two distinct operations that are done in the system regarding color (and hence, intensity) correction:

(1) Estimation of the color distortions (which is done as part of the calibration phase).

(2) Color correction of all the pixels in each projected frame (which is done by the hardware which controls the projector).

The color distortions estimation is done as part of the system calibration phase. It is based on using the video cameras (CCDs) as color measuring tools. Each camera is aimed towards the border of a plurality of adjacent regions, e.g., as shown in FIG. 23b or FIG. 23c. Thus the camera is used first of all to measure the relative color differences between neighboring projectors. This is done by repeating several times the following basic step (which is comprised of the following operations):

(1) Project the same color and intensity (i.e. the same R/G/B digital values) by the two (or four) adjacent projectors.

(2) Capture a snapshot of the area covered by the projectors. This step may be repeated several times to improve the SNR by averaging the snapshots.

(3) Analyze the captured image to estimate $R_i/G_i/B_i$ of the two (or more) projectors, as seen by the camera e.g., in the FIG. 23b or 23c arrangement. This is done by simply averaging the pixels which were projected by each projector separately.

This basic step is repeated many times for various R/G/B configurations subject to the limitation that only one color component takes a non-zero value. There is no need to measure complex R/G/B configurations since they are all linear combinations of the basic R/O/O, O/G/O and O/O/B patterns.

The next step is to convert the $R_i/G_i/B_i$ measurements to the CIE-XYZ chromaticity coordinates system. This is a problem which is solved in the literature, see for example: "Connoly C., Leung T. W. W. and Nobbs J., 'The Use of Video Cameras for remote Colour Measurement', submitted to Journal of Society of Dyers and Colorists, February 1995".

The problem to be solved now is well known in the literature as "Gamut Mapping" (or alternatively as "Color Space Transformation"). The objective is to present a colored image using a restricted set (i.e. reduced space) of colors so that it will be seen by an average human viewer as close as possible to the original image. Good references are: Roy Hall, "Illumination and Color in Computer Generated Imagery", (Spring Verlag 1989) and "Device Directed Rendering" by A. S. Glassner et al, ACM, Transaction on Graphics, VOL 14 No. 1 January-95; pages 58–76.

The color correction is done on each pixel by the hardware. The correction comprises three operations:

(1) Linearization: Using a table look-up, each of the R/G/B values is replaced by $X=X^\gamma-X_0$ where X stands for R/G/B respectively and γ (Gamma) is a known constant characterizing the electro-optical properties of the projector. This step is called "linearization" since the new values are linearly proportional to the physically measured illumination produced by the projector.

(2) Transformation: A simple linear transformation (using a 3×3 matrix) which result in a new R/G/B triplet.

(3) De-Linearization: The inverse operation of the first step is performed to prepare the R/G/B values properly to be projected by the projector (which applies a built-in gamma on its digital input).

Figure 25:
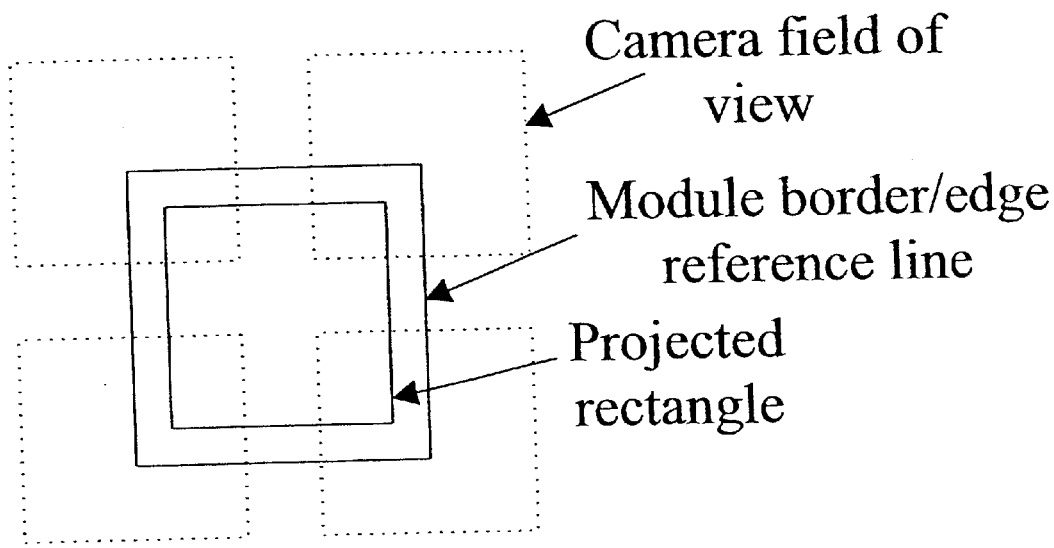
FIGS. 25 and 26 are diagrams helpful in explaining the flowchart of FIG. 24.
Figure 26:
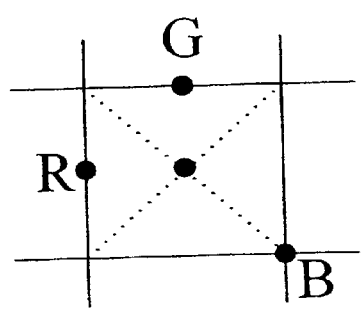

The flowchart of FIG. 24 illustrates the foregoing steps involved in the correction for color convergence distortions in a single projector, and the diagram of FIGS. 25 and 26 illustrate this operation. Completion of the four steps set forth in the flowchart of FIG. 24 results in a correction table in which each color pixel has been moved the required sub-pixel value to correct for color convergence distortions.

Correcting Geometric Distortions

The following description presents an alternative embodiment to operations B and C which are presented in FIG. 14 as part of the main embodiment.

This alternative embodiment is based on the existance, and the possibility to detect, fixed reference lines which are located exactly between the adjacent Fresnel lenses. By adjusting the shape of each projected image to fill precisely into the rectangle formed by the reference lines, the need in global adjustment (i.e. the above mentioned operation C) is avoided. The detection of the reference lines is enabled by the fact that the camera receives light emitted from the back side of element 108 (in FIG. 19).

Image shape adjustment is done digitally by implementing a well known resampling algorithm (as in the above mentioned operation B). The resampling is done on each projected image separately in exactly the same manner. The resampling is done using a non-varying non-homogenous non-linear pixel distribution. Thus means that the location of each resampled pixel is pre-determined once using a complex formula which takes into account the pixel desired location on the screen, and various distortion parameters which characterize the projector. For example, if it is found that the projector is misaligned by 0.5 pixel to the right (denoted as X=0.5) when projecting the original image, then each projected pixel int he reshaped image is resampled 0.5 pixel to the left of the corresponding original pixel. The actual formula in this embodiment similarly takes into account vertical shift (denoted as Y), zoom factor (M), axial rotation (R), horizontal and vertical keystone (KSx,KSy) and the Pin Cushion effect (PC) or barrel effect.

Figure 27:
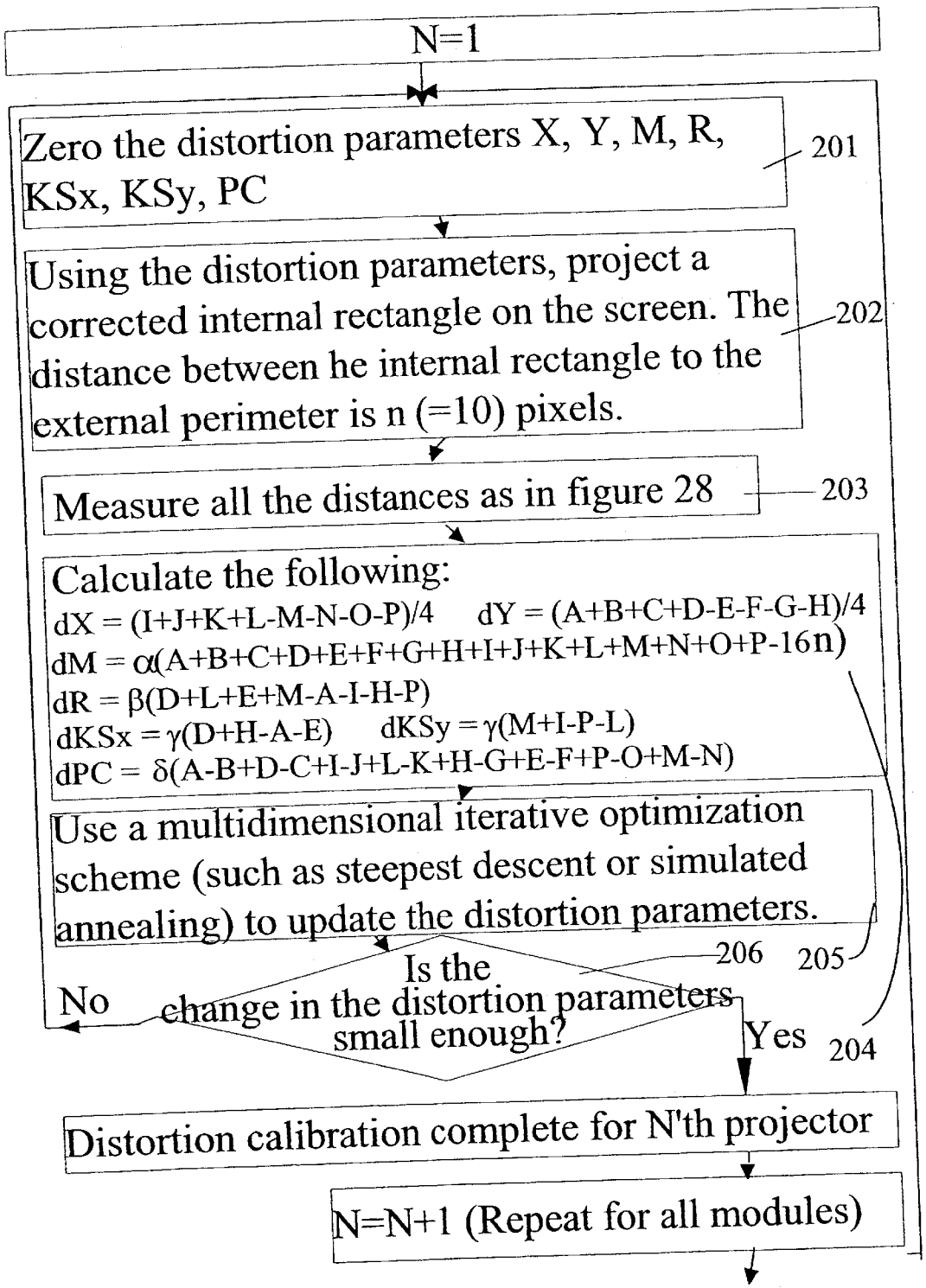
FIG. 27 is a flowchart illustrating one example of the operations involved in similarly correcting geometrical distortions.
Figure 28:
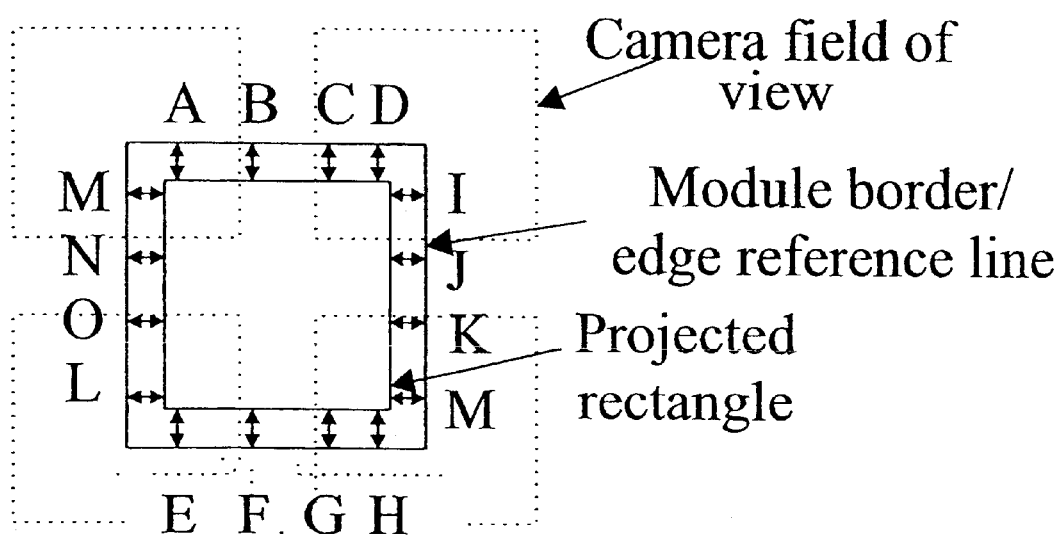
FIG. 28 is a diagram helpful in explaining the flowchart of FIG. 27.

These distortion parameters are found once during the system calibration step using the algorithm illustrated in FIG. 27, as follows:

Each module is calibrated separately in this scheme. The algorithm starts by setting all the distortion parameters of the current module (which are initially known) to zero (step 201, FIG. 27). This results in projecting images just as they are, with no reshaping. The algorithm uses only one type of image, which is a rectangle internal to the reference lines (as can be seen in FIG. 28). The distance between the points forming the internal rectangle to the external rectangle (formed by the reference lines) is constant. The algorithm is iterative, trying to improve the values of the distortion parameters in each iteration.

In step 202 (FIG. 27), an image forming an internal rectangle, corrected using the current values of the distortion parameters, is projected. In step 203 the image is captured and the distances shown in FIG. 28 are measured. In step 204 the corrections to the distortion parameters (i.e., dX, dY, dM, etc.) are computed using the distances measured in step 203. The following is the heart of this algorithm: if the distortion parameters are correct, the internal rectangle is projected properly; hence all the distances measured in step 203 are equal, and the quantities calculated in step 204 are all zero.

In step 205 the distortion parameters are updated using the corrections found in step 204 using expressions such as: X=X+dX, Y=Y+dY, etc. The exact expressions are specific to the iterative algorithm used to control the convergence of the distortion parameters. One possible algorithm is the "Direction Set" (or "Conjugates Gradient") technique (such as described in "Numerical Recipies in C" by W.H. Press, B. P. Flannery, S. A. Teukalsky and W. T. Betterling, Cambridge University Press, ISBN-0-521-35465-X, Chapter 10 (Minimization or Maximization of Functions), First Edition, 1988).

In step 206 the relative change in the distortion parameters is evaluated. If this value is close enough to zero, then the algorithm stops. Otherwise, a new iteration is started by going back to step 202. However, this time the internal rectangle is resampled in a different way than in the previous iteration. Hence it is projected in a form which is closer to a perfect rectangle as it should be.

While the invention has been described with respect to several preferred embodiments, it will be appreciated that these are set forth merely for purposes of example, and that many changes may be made. For example, each modular unit could include its own screen, with a separate combined screen applied to overlie all the screens of the modular units. Also, the calibration operations can be performed by an external computer. Many other variations, modifications and applications of the invention will be apparent.

What is claimed is:

1. Electro-optical display apparatus, comprising:
    a plurality of modular units each including a projector for receiving electrical signals, converting them to optical images, and projecting said optical images via an optical projection system onto a screen;
    said plurality of modular units being arranged in a side-by-side array such as to produce a combined display on said screen;
    said apparatus further comprising a calibration system including an image sensor for sensing an optical image on said screen, and imaging means spaced from the screen and producing an image of the screen on said image sensor, for detecting geometrical distortions in said combined display caused by said projection system of each modular unit and for modifying the electrical signals applied to said projector of each modular unit to correct said combined display with respect to said detected geometrical distortions;
    said image sensor and imaging means being located on the same side of the screen as the projectors for the plurality of modular units;
    said calibration system further including a two-dimensional array of reference points of known locations on the face of said screen, and means for generating a projector-path correction table for each modular unit for correcting discrepancies between the known locations of said two-dimensional array of reference points on said screen and the corresponding locations of the two-dimensional array of reference points as projected on said screen.

2. The apparatus according to claim 1,
    wherein said screen is constituted of a plurality of modular unit screens, one provided on each of said modular units;
    and wherein said imaging means includes an imaging lens for each modular unit for imaging its respective modular unit screen on said image sensor.

3. The apparatus according to claim 1, wherein said imaging means is an imaging lens, and said screen is of a size and configuration to overlie all said modular units.

4. The apparatus according to claim 1, wherein said two-dimensional array of reference points are defined by the intersection points of a plurality of horizontal reference lines and a plurality of vertical reference lines on said screen.

5. The apparatus according to claim 4, wherein said horizontal and vertical reference lines are produced by luminescent material carried on a face of said screen, and a light source for exciting said luminescent material to cause it to emit light.

6. The apparatus according to claim 5, wherein said screen is a light-transmissive screen and said reference lines of luminescent material are on the rear face of said screen, the front face of said screen serving as a writing surface.

7. The apparatus according to claim 1, wherein said two-dimensional array of reference points are the ends of optical fibers on said screen.

8. The apparatus according to claim 1, wherein said calibration system also generates an image path correction table for each modular unit for correcting discrepancies between the known locations of said two-dimensional array of reference points on said screen and the corresponding locations of the two-dimensional array of reference points as imaged on said screen.

9. The apparatus according to claim 1, wherein said calibration system also utilizes said two-dimensional array of reference points on said screen to combine the displays such as to eliminate overlaps and gaps in said combined display.

10. The apparatus according to claim 1, wherein said screen further includes a plurality of optical fibers having one of their ends at a plurality of spaced locations on the inner face of said screen for sensing the light intensity at said locations;

and wherein said apparatus further includes light detectors connected to the opposite ends of said optical fibers producing electrical outputs corresponding to said sensed light intensity, and a control circuit for controlling the optical projectors of said modular units to make uniform their light intensities.

11. The apparatus according to claim 1, wherein:

each of said projectors includes a drive having a plurality of degrees of movement;

and said calibration system also corrects at least some of the detected distortions by controlling the drives of said projectors.

12. The apparatus according to claim 1, wherein said calibration system also detects and corrects color convergence distortions by:

imaging a plurality of neighboring projected regions to produce an optical image of such neighboring regions on an image sensor;

analyzing said optical image to estimate the color convergence distortions in the color pixels of said image;

and digitally relocating each color pixel in said combined display a sub-pixel value to correct for said color convergence distortions.

13. The apparatus according to claim 1, wherein;

each projector includes a Fresnel lens which collimates the light from the respective projector;

said screen being a common screen having a light-diffusing surface overlying all said Fresnel lenses;

and wherein said apparatus further includes a blocking element underlying junctures between adjacent Fresnel lenses in order to reduce overlapping of the light from the projectors and thereby to produce a seamless combined display.

14. A method of producing an electro-optical display, comprising:

providing a plurality of modular units each including a projector for receiving electrical signals, converting them to optical images, and projecting said optical images via an optical projection system on a screen;

arranging said plurality of modular units in a side-by-side array such as to combine their respective displays to produce a combined display;

imaging said screen via imaging means spaced from the screen and producing an image of the screen on an image sensor on the same side of the screen as the projectors of the modular units for detecting geometrical distortions in said combined display;

and modifying the electrical signals applied to said projector of each modular unit to correct said combined display with respect to said detected geometrical distortions by producing a two-dimensional array of reference points at known locations on the face of said screen, and generating a projector-path correction table for each modular unit for correcting discrepancies between the known locations of said two-dimensional array of reference points on said screen and the corresponding locations of the two-dimensional array of reference points as projected on said screen.

15. The method according to claim 14, wherein said two-dimensional array of reference points are produced by the intersection points of a plurality of horizontal reference lines and a plurality of vertical reference lines applied to said screen.

16. The method according to claim 15, wherein said horizontal and vertical reference lines are produced by depositing luminescent material on the face of said screen, and exciting said luminescent material by a light source to cause it to emit light.

17. The method according to claim 16, wherein said reference lines of luminescent material are applied to the rear face of said screen, the front face of said screen serving as a writing surface.

18. The method according to claim 14, wherein said two-dimensional array of reference points are produced by the ends of optical fibers carried by said screen.

19. The method according to claim 14, wherein an image path correction table is also generated for each modular unit for correcting discrepancies between the known locations of said two-dimensional array of reference points on said screen and the corresponding locations of the two-dimensional array of reference points as imaged on said screen.

20. The method according to claim 14, wherein said two-dimensional array of reference points on said screen are utilized to combine the displays of the modular units such as to eliminate overlaps and gaps in said combined display.

21. The method according to claim 14, wherein the light intensity is sensed at each of a plurality of spaced locations on the inner face of said screen; and the optical projectors of said modular units are controlled to make uniform their light intensities.

22. The method according to claim 14, wherein:

each of said projectors includes a drive having a plurality of degrees of movement;

and the drives of said projectors are controlled to correct at least some of the detected distortions.

23. The method according to claim 14, wherein color distortions are also corrected by detecting the intensity of each color component in the combined display; and modifying the electrical signals applied to said projector of each modular unit to correct said combined display with respect to said color distortions.

24. The method according to claim 14, wherein color convergence distortions are corrected by:

imaging a plurality of neighboring projected regions to produce an optical image of such neighboring regions on an image sensor;

analyzing said optical image to estimate the color convergence distortions in the color pixels of said image;

and digitally relocating each color pixel in said combined display a sub-pixel value to correct for said color convergence distortions.

25. The method according to claim 14, wherein;

each projector includes a Fresnel lens which collimates the light from the respective projector;

and a common screen having a light-defusing surface overlying all said Fresnel lenses;

and a blocking element is provided to underlie the juncture between adjacent Fresnel lenses in order to reduce overlapping of the light from the projectors and thereby to produce a seamless combined display.

* * * * *